US006427058B1

(12) United States Patent
Akiba et al.

(10) Patent No.: US 6,427,058 B1
(45) Date of Patent: Jul. 30, 2002

(54) IMAGE FORMING APPARATUS HAVING A 1 TO N MODE OF DIVIDING AN ORIGINAL INTO A PLURALITY OF REGIONS

(75) Inventors: Rieko Akiba; Hideyuki Ikegami, both of Shizuoka-ken; Shunsaku Kondo, Numazu, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/430,024

(22) Filed: Oct. 29, 1999

(30) Foreign Application Priority Data

Nov. 4, 1998 (JP) .......................................... 10-327552

(51) Int. Cl.[7] .............................................. G03G 15/00
(52) U.S. Cl. .......................... 399/82; 399/183; 358/453
(58) Field of Search ................................ 399/194, 182, 399/183, 82, 85; 358/1.18, 450, 300, 302, 452, 453

(56) References Cited

U.S. PATENT DOCUMENTS

| 4,707,126 A | * | 11/1987 | Ohshima et al. ............... 399/14 |
| 4,812,874 A | * | 3/1989 | Kubota et al. ............... 399/185 |
| 5,051,843 A | * | 9/1991 | Hayashi ....................... 358/450 |
| 5,311,259 A | * | 5/1994 | Moriya et al. ................. 399/86 |
| 5,457,543 A | * | 10/1995 | Maeda ......................... 358/401 |
| 5,475,475 A | * | 12/1995 | Kohtani et al. ................ 399/79 |
| 5,530,560 A | * | 6/1996 | Nakajima ..................... 358/453 |
| 5,694,486 A | * | 12/1997 | Shigeeda et al. ............ 382/197 |
| 5,867,279 A | * | 2/1999 | Funamizu et al. ........... 358/296 |
| 5,940,543 A | * | 8/1999 | Isemura et al. .............. 382/284 |
| 6,084,988 A | * | 7/2000 | Kanno et al. ................ 382/289 |
| 6,144,777 A | * | 11/2000 | Tada et al. ................... 382/284 |
| 6,191,870 B1 | * | 2/2001 | Takayanagi ................. 358/450 |

FOREIGN PATENT DOCUMENTS

| EP | 0790735 | 8/1997 | .......... H04N/1/387 |
| JP | 9-222824 | 8/1997 | .......... G03G/15/36 |

* cited by examiner

*Primary Examiner*—Robert Beatty
(74) *Attorney, Agent, or Firm*—Fitzpatrick, Cella, Harper & Scinto

(57) ABSTRACT

In a 1 to N mode of dividing a series of pages of an original into a plurality of regions and recording images in the respective regions on different sheets, the order of output of the respective regions can be selected. A predetermined page of the series of original pages can be inhibited from being divided.

7 Claims, 27 Drawing Sheets

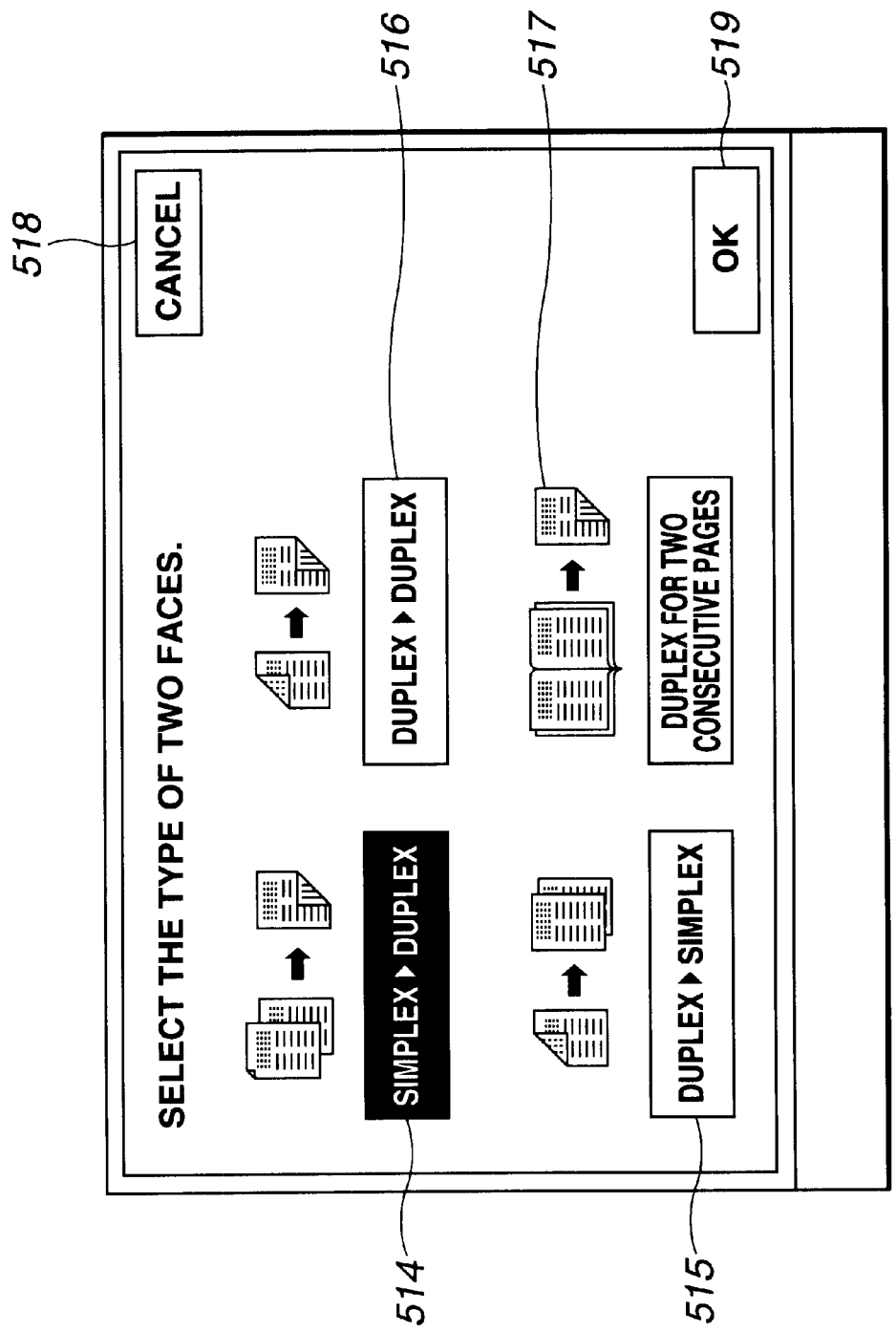

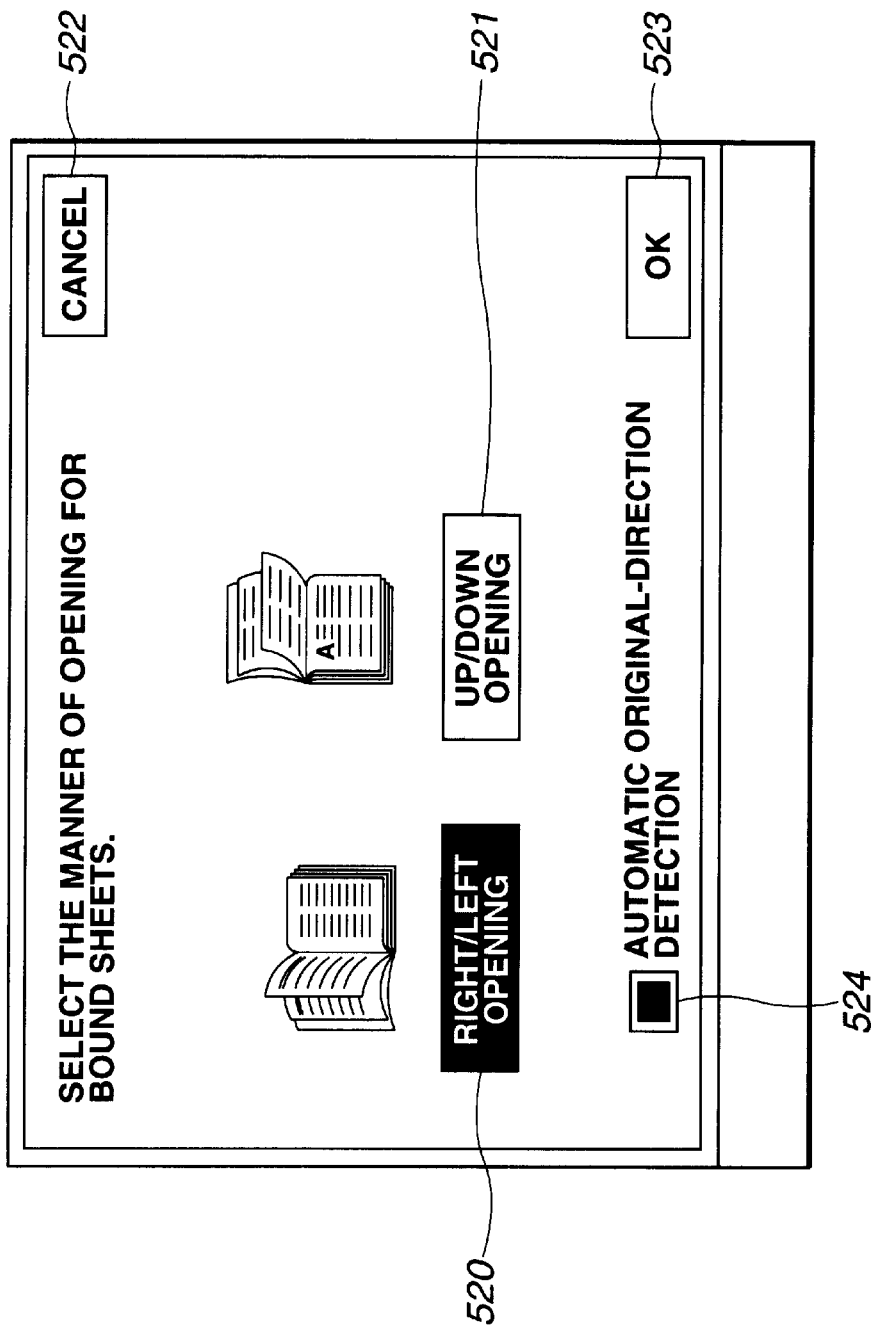

IMAGE FORMING APPARATUS HAVING A 1 TO N MODE OF DIVIDING AN ORIGINAL INTO A PLURALITY OF REGIONS

BACKGROUND OF THE INVENTION

1. Field of the Invention

The present invention relates to an image forming apparatus having an Nin1 (en-in-one) function of recording a plurality of images on a sheet.

2. Description of the Related Art

Image forming apparatuses having a function of a reduced-layout mode (Nin1 mode) in which respective images of a plurality of originals are recorded on a sheet, have been known.

In the conventional reduced-layout mode, images are output only with one type of layout, in which the first page, the second page, the third page and the fourth page of originals are recorded on the upper left, upper right, lower left and lower right portions of a sheet, respectively.

Accordingly, the order of arrangement is, in some cases, improper, depending on the direction (orientation) of characters within an original or the direction (orientation) of the original.

In order to solve such problems, there is an invention described in Japanese Patent Laid-Open Application (Kokai) No. 9-222824 (1997) (European Patent 0790735).

This application describes that the direction of an original and the direction of characters within the original are detected, and the position of arrangement of a plurality of originals is automatically determined.

In that invention, however, since the operator cannot freely determine the position of arrangement, the user does not always obtain a desired arrangement for an original having no characters, or an original in which the direction of images cannot be specified.

Furthermore, since it is assumed in that invention that the direction of images on all originals is the same, improper images are formed when originals having different directions of images are mixed, or when a part of the originals are set in a wrong direction.

In a magnified-layout mode in which an image formed in the reduced-layout mode is divided and magnified in order to provide copies of a plurality of originals before being reduced, also, if the order of division is fixed, the image cannot, in some cases, be divided with a proper order.

SUMMARY OF THE INVENTION

It is an object of the present invention to provide an image forming apparatus and method in which the above-described problems are solved.

It is another object of the present invention to provide an image forming apparatus and method which can record respective images of a plurality of originals with a desired arrangement.

It is still another object of the present invention to provide an image forming apparatus and method which can perform Nin1 recording with a proper direction even if the operator is not specifically aware of the direction of each of the of originals.

It is yet another object of the present invention to provide an image forming apparatus and method in which, when dividing an image for Nin1 recording and obtaining magnified copies of the resultant images, the image can be divided with a desired order, and a plurality of images can be output with a proper order.

According to one aspect of the present invention, an image forming apparatus includes a reading unit for reading an image of each original, determination means for determining a direction of the image of the original read by the reading unit, mode setting means for setting an Nin1 mode of recording respective images of a plurality of originals on a sheet, selection means for manually selecting a layout of the plurality of originals in the Nin1 mode, and layout means for laying out the respective images of the plurality of originals by rotating the image of each original based on the direction of the image of the original determined by the determination means and the layout selected by the selection means.

According to another aspect of the present invention, an image forming method includes the steps of setting an Nin1 mode of recording respective images of a plurality of originals on a sheet, determining a layout of a plurality of originals selected by a user, inputting the images of selected originals, determining a direction of the input image of each original, and laying out the input images by rotating the image of each original based on the determined direction of the image of each original and the determined layout.

According to still another aspect of the present invention, in a recording medium, capable of being read by a computer, is stored a program for causing an image forming apparatus to execute the following steps. The program includes the steps of setting an Nin1 mode of recording respective images of a plurality of originals on a sheet, determining a layout of a plurality of originals selected by a user, inputting the images of selected originals, determining a direction of the input image of each original, and laying out the input images of respective originals by rotating the image of each original based on the determined direction of the image of each original and the determined layout.

According to yet another aspect of the present invention, an image forming apparatus includes a reading unit for reading an image of an original, mode setting means for setting a 1toN ("one-to-en") mode of dividing an image of an original into a plurality of regions and recording an image in each of the regions on a different sheet, and selection means for manually selecting an order of output of the plurality of regions in the 1 to N mode.

The foregoing and other objects, advantages and features of the present invention will become more apparent from the following detailed description of the preferred embodiments taken in conjunction with the accompanying drawings.

BRIEF DESCRIPTION OF THE DRAWINGS

FIG. 7 is diagram illustrating a picture frame for setting a duplex mode;

FIG. 8 is a diagram illustrating a picture frame for setting a duplex printing mode;

DETAILED DESCRIPTION OF THE PREFERRED EMBODIMENTS

Preferred embodiments of the present invention will now be described with reference to the drawings.

Figure 1:
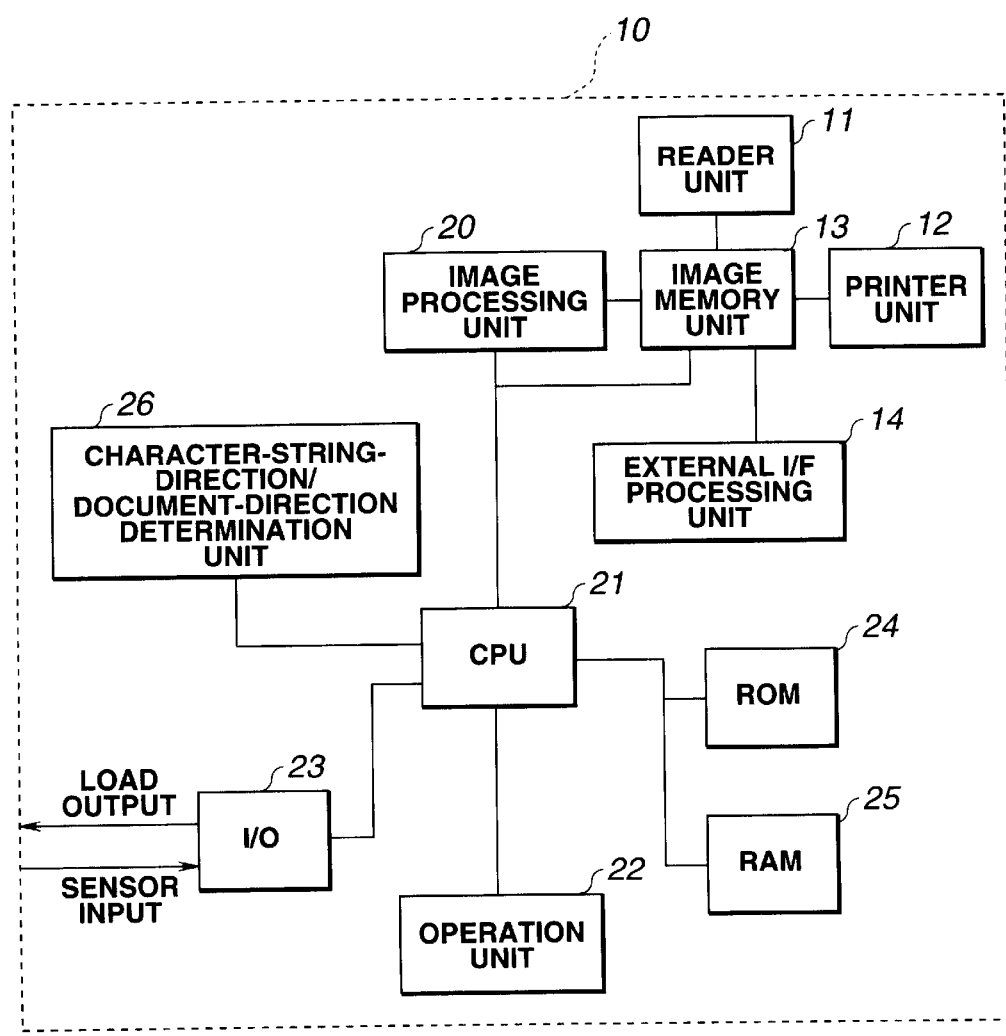
FIG. 1 is a block diagram illustrating the basic configuration of an image forming apparatus according to a first embodiment of the present invention.

FIG. 1 is a block diagram illustrating the basic configuration of an image forming apparatus according to a first embodiment of the present invention.

This image forming apparatus is configured as a digital copier 10. A ROM (read-only memory) 24 in which control programs are written, a working RAM (random access memory) 25 for performing processing, and an input/output (I/O) port 23 are each connected to a CPU 21, which performs basic control of the copier 10, via an address bus or a data bus. Various loads (not shown), such as motors, clutches and the like, for controlling the copier 10, one or more sensors for detecting the position of a sheet (not shown), and the like are connected to the input/output port 23.

The CPU 21 sequentially performs input/output control via the input/output port 23 in accordance with the contents of the ROM 24, and executes a copying operation.

An operation unit 22 for displaying the state of the copier 10, an image processing unit 20 for processing an image converted into an electrical signal by an image sensor unit 108 shown in FIG. 4 (to be described below), an image memory unit 13 for storing the processed image, and a character-string-direction/document-direction determination unit 26 for determining the direction (orientation) of a character string of an image and the direction (orientation) of a document are connected to the CPU 21.

A reader unit 11 for reading an image, a printer unit 12 for forming an image on a sheet, and an external I/F processing unit 14 are connected to the image memory unit 13. The external I/F processing unit 14 develops a PDL (process design language) input from an external computer into bit-map data.

Figure 2:
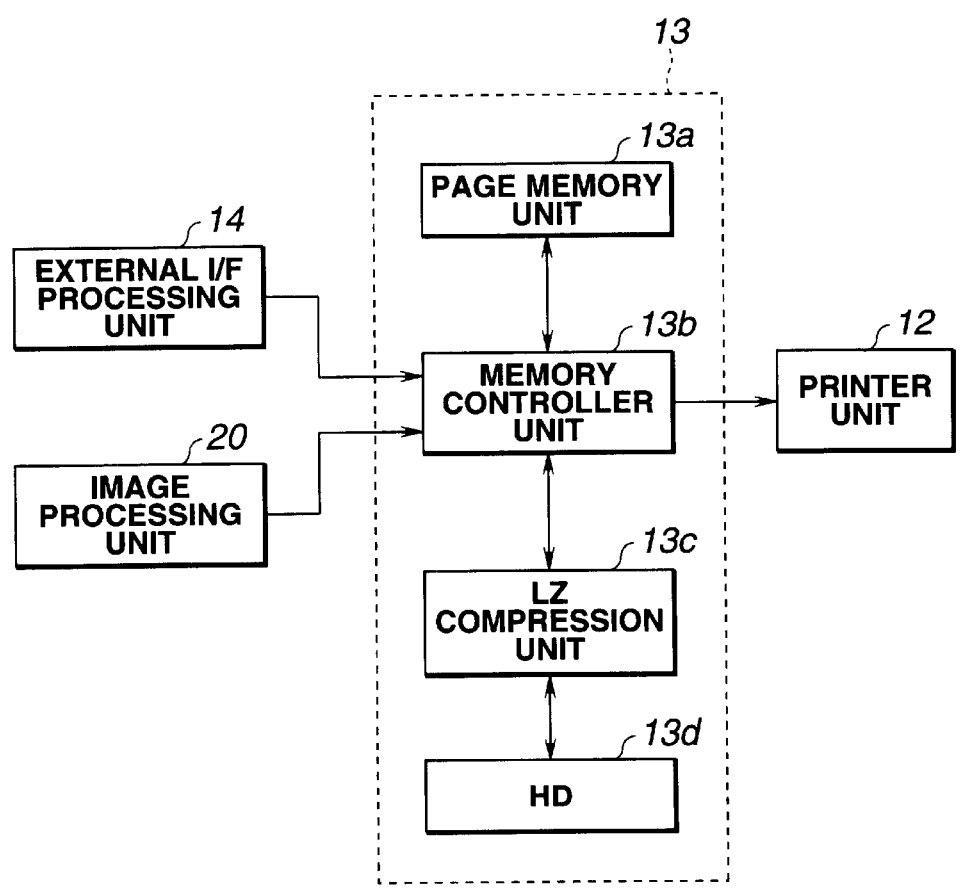
FIG. 2 is a block diagram illustrating the details of an image memory unit 13 shown in FIG. 1.

FIG. 2 is a block diagram illustrating the details of the image memory unit 13.

The image memory unit 13 writes a binary image from the external I/F processing unit 14 and the image processing unit 20 into a page memory unit 13a comprising a memory, such as a DRAM (dynamic RAM) or the like, via a memory controller unit 13b, and performs image outputting to the printer unit 12, and input/output access of an image with respect to a hard disk (HD) 13d, serving as a large-capacity storage device. An LZ compression unit 13c performs compression/decompressing of image data in accordance with input/output with respect to the hard disk 13c.

The memory controller unit 13b generates a DRAM refreshing signal for the page memory unit 13a, and also arbitrates access to the page memory unit 13a from the external I/F unit 14, the image processing unit 20 and the hard disk 13d. The memory controller unit 13b also controls a write address for writing to the page memory unit 13a, a read address for reading from the page memory unit 13a, the direction of reading, or the like in accordance with an instruction from the CPU 21. The CPU 21 thereby performs layout by arranging respective images of a plurality of originals in the page memory unit 13a (an Nin1 mode), and controls the function of outputting the images of the originals to the printer unit 12, the function of segmenting only a part of an image and outputting the segmented image, the image rotation function, and the like.

Figure 3:
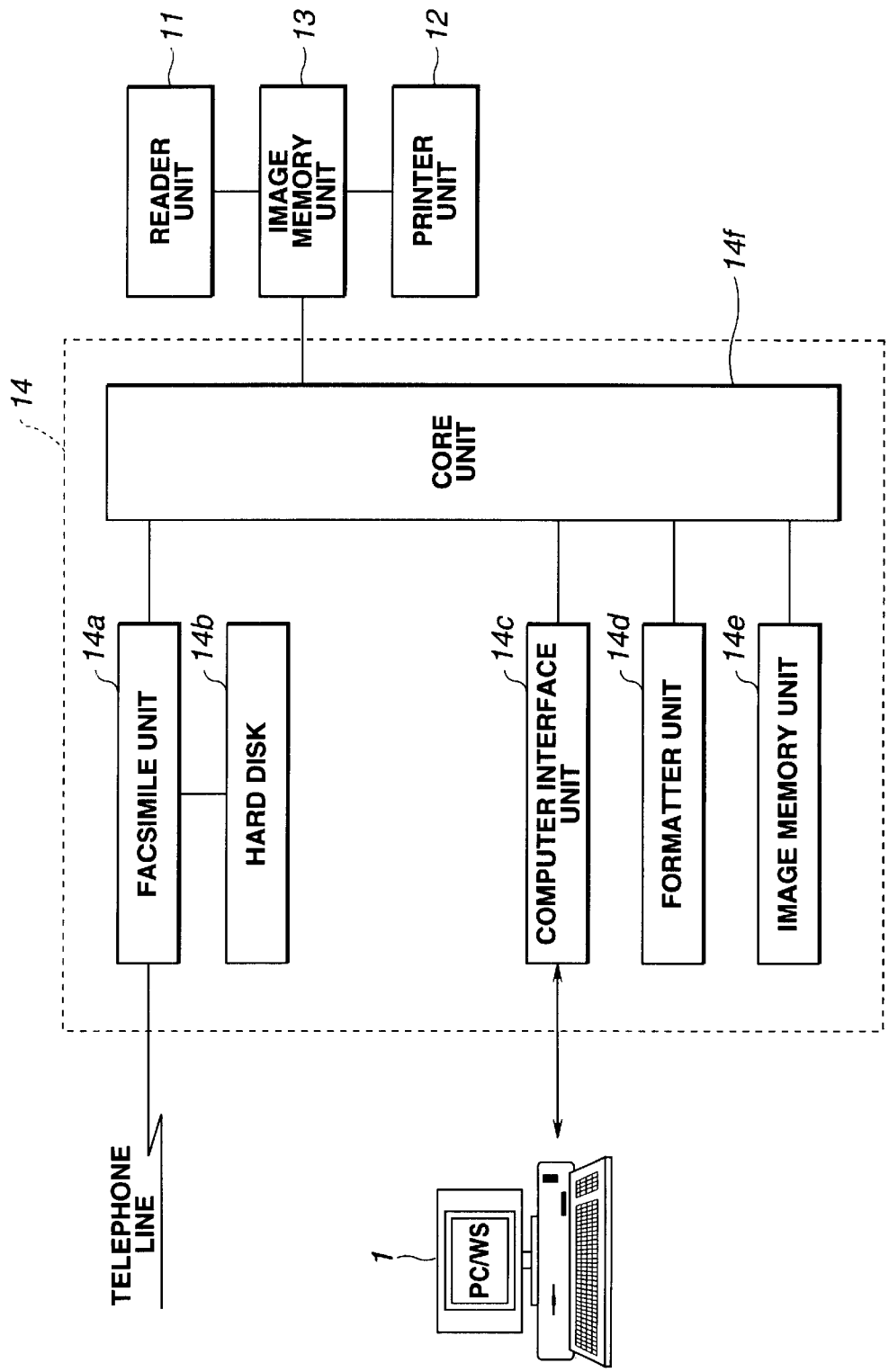
FIG. 3 is a block diagram illustrating the configuration of an external I/F processing unit 14 shown in FIG. 1.

FIG. 3 is a block diagram illustrating the configuration of the external I/F processing unit 14.

As described above, the external I/F processing unit 14 has the functions of receiving binary image data of the reader unit 11 via the image memory unit 13 and outputting the image data to the printer unit 12 via the image memory unit 13.

The external I/F unit 14 includes a facsimile unit 14a, a hard disk 14b for preserving communication image data of the facsimile unit 14a, a computer interface unit 14c for connecting the external I/F processing unit 14 to an external computer 1, a formatter unit 14d and an image memory unit 14e which are connected to a core unit 14f.

The facsimile unit 14a is connected to a public network via a modem (not shown), and performs reception of fasimile communication data from the public network, and transmission of facsimile communication data to the public network. The facsimile unit 14a performs, for example, processing of performing facsimile transmission at an assigned time and transmission of image data in response to an inquiry using an assigned password from the communication partner, by preserving images for facsimile on the hard disk 14b. Thus, after transmitting an image from the reader unit 11 to the facsimile unit 14a and the hard disk 14b for facsimile via the image memory unit 13, it is possible to perform facsimile transmission of the image without using the reader unit 11 and the image memory unit 13 for the facsimile function.

The computer interface (I/F) unit 14c performs data communication with the external computer 1, and includes a local area network (hereinafter abbreviated as "LAN"), a serial I/F, an SCSI (small computer system interface), a Centronics I/F for inputting printer data, and the like. The states of the printer unit 12 and the reader unit 11 are notified to the external computer 1, and an image read by the reader unit 1 is transferred to the external computer 1 based on an instruction from the computer 1, via the I/F unit 14c.

The computer interface unit 14c also receives printing data from the external computer 1. Since printing data sent by the external computer 1 via the computer interface unit 14c is described in dedicated printer codes, the formatter unit 14d converts the codes into raster-image data for image formation by the printer unit 12.

The formatter unit 14d also develops the raster-image data in the image memory unit 14e. The image memory unit 14e is thus used as a memory for the development of the raster-image data by the formatter unit 14d, and is also used in a case in which, when transmitting the image of the reader unit 11 to the external computer 1 via the computer interface unit 14c (an image scanner function), image data transmitted from the image memory unit 13 is first developed in the image memory unit 14e and then converted into a data format for transmission to the external computer 1, and the resultant data is transmitted from the computer interface unit 14c.

The core unit 14f controls data transfer between each of the facsimile unit 14a, the computer interface unit 14c, the formatter unit 14d and the image memory unit 14e, and the image memory unit 13. Thus, even if the external I/F processing unit 14 has a plurality of image output units, or only one image transfer channel to the image memory unit 13 is provided, image output is effected by performing exclusive control and priority control under the control of the core unit 14f.

Figure 4:
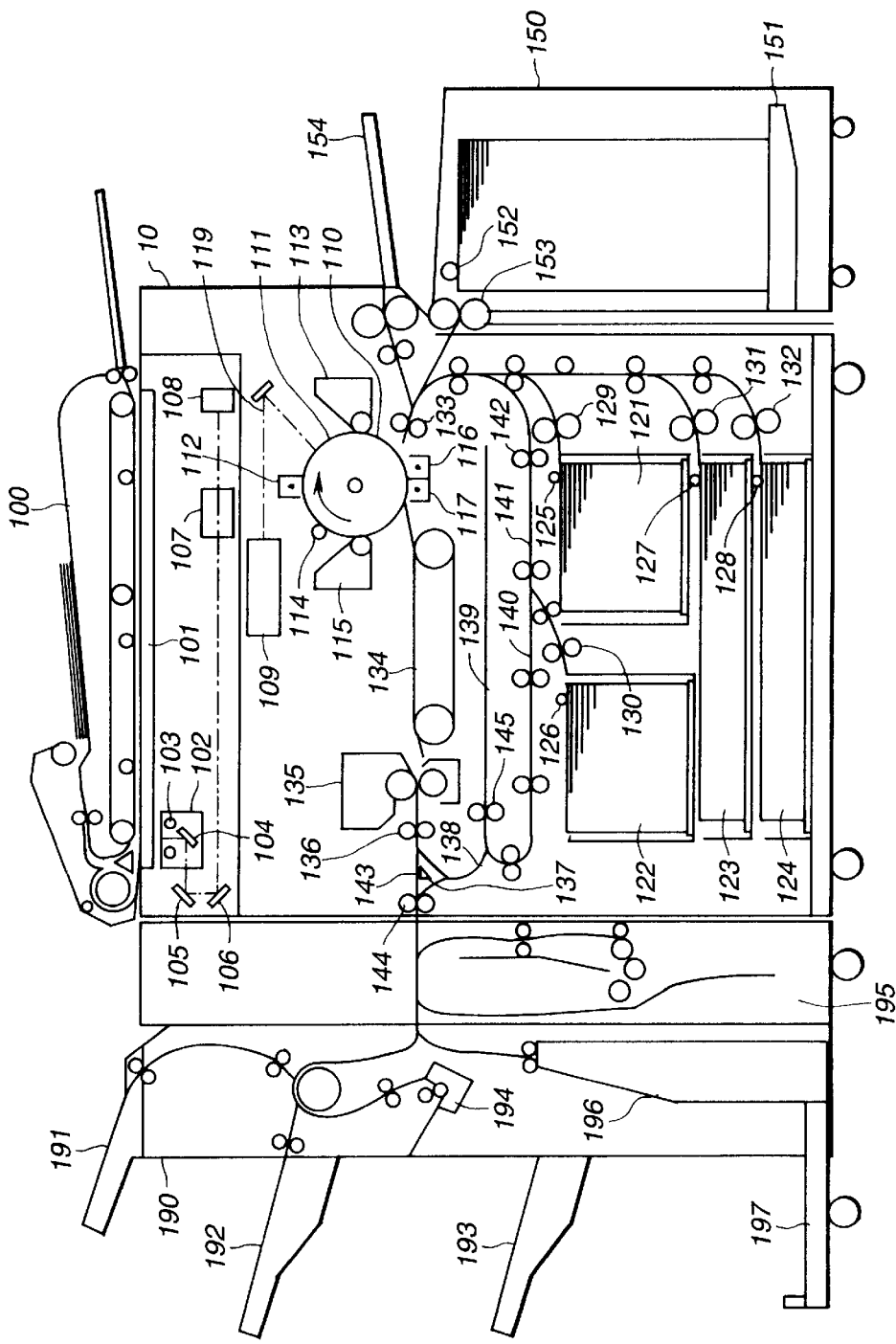
FIG. 4 is a cross-sectional view illustrating the configuration of a digital copier 10, serving as the image forming/apparatus of the first embodiment.

FIG. 4 is a cross-sectional view illustrating the configuration of an example of the above-described digital copier 10.

An automatic original-feeder 100 is disposed on platen glass 101 provided at an upper portion of the main body of the digital copier 10. The platen glass 101 is used for mounting an original thereon. A scanner 102 includes an original-illuminating lamp 103, a scanning mirror 104 and the like, and scans the original on the platen glass 101 by being reciprocated in predetermined directions by a motor (not shown). Reflected light from the original is focused onto a CCD (charge-coupled device) sensor within the image sensor unit 108 after passing through scanning mirrors 104–106 and a lens 107.

An exposure control unit 109 includes a laser, a polygonal scanner and the like, and projects a laser beam 119, modulated based on an image signal subjected to predetermined image processing after being converted into an electrical signal by the image sensor unit 108, onto a photosensitive drum 111. A primary charger 112, a developing unit 113, a transfer charger 116, a pre-exposure lamp 114 and a cleaning device 115 are disposed around the photosensitive drum 111.

In such an image forming unit 110, the photosensitive drum 111 is rotated in a direction indicated by the arrow by a motor (not shown), and is charged to a desired potential by the primary charger 112. The laser beam 119 from the exposure control unit 109 is then projected onto the photosensitive drum 111 to form an electrostatic latent image thereon. The electrostatic latent image formed on the photosensitive drum 111 is developed by the developing unit 113 to form a visualized toner image.

A transfer sheet fed from a right-hand cassette deck 121, a left-hand cassette deck 122, an upper cassette 123 or a lower cassette 124 via a pickup roller 125, 126, 127 or 128 is further fed by a pair of sheet feeding rollers 129, 130, 131 or 132, respectively. The transfer sheet is then fed to a transfer belt 134 by a pair of registration rollers 133, and the visualized toner image is transferred onto the transfer sheet by the transfer charger 116.

Toner particles remaining on the photosensitive drum 111 after the image transfer are cleaned by the cleaning device 115, and charges remaining on the photosensitive drum 111 are erased by the pre-exposure lamp 114. The transfer sheet, after the image transfer, is separated from the photosensitive drum 111 by a separation charger 117, and is fed to a fixing unit 135 by a transfer belt 134. The toner image on the transfer sheet is fixed by the fixing unit 135 by means of pressure and heat, and the transfer sheet is then discharged to the outside of the copier 10 by a pair of discharging rollers 136.

A deck 150 capable of accommodating, for example, 4,000 transfer sheets is provided for the copier 10. A lifter 151 of the deck 150 is raised in accordance with the number of transfer sheets so that the top transfer sheet always contacts a pickup roller 152, and the transfer sheets are individually fed to the main body of the copier 10 by a pair of sheet feeding rollers 153. A multisheet manual insertion tray 154 capable of accommodating 100 transfer sheets is also mounted on the main body of the copier 10.

A sheet discharging flapper 137 performs switching between a conveyance path 138 and a discharging path 143. A lower conveyance path 140 guides the transfer sheet fed from the sheet discharging rollers 136 to a sheet refeeding path 141 via a reversal path 139 by turning the transfer sheet. A transfer sheet fed from the left cassette deck 122 by the sheet feeding rollers 130 is also guided to the sheet refeeding path 141.

Sheet refeeding rollers 142 refeed the transfer sheet to the image forming unit 110. Sheet discharging rollers 144 are disposed near the sheet discharging flapper 137, and discharge the transfer sheet switched to the discharging path 143 by the sheet discharging flapper 137 to the outside of the copier 10.

When performing duplex recording (copying on both surfaces of a transfer sheet), a transfer sheet having an image formed on one surface thereof is guided to the sheet refeeding path 141 via the conveyance path 138, the reversal path 139 and the lower conveyance path 140 by raising the sheet discharging flapper 137 upward. At that time, the transfer sheet is drawn into the reversal path 139 to a position of a state in which the trailing edge of the transfer sheet completely leaves the conveyance path 138 by reversal rollers 145 and the transfer sheet is grasped by the reversal rollers 145, and is then fed to the lower conveyance path 140 by inversely rotating the reversal rollers 145.

On the other hand, for discharging the transfer sheet from the main body of the copier 10 in a reversed direction (orientation), by a raising of the sheet discharging flapper 137 upward, a drawing of the transfer sheet by the reversal rollers 145 into the reveresal path 139 to a position of a state in which the trailing edge of the transfer sheet remains in the conveynace path 128, and then an inverse rotation of the reversal rollers 145, the transfer sheet is fed to the discharging rollers 144 in a state of being turned.

A sheet discharging processing apparatus 190 aligns transfer sheets individually discharged from the main body of the digital copier 10 in a state of being received on a processing tray 194. Upon completion of discharge of one unit (set) of transfer sheets having images formed thereon, a bundle of the transfer sheets is stapled and discharged onto a discharged-sheet tray 192 or 193. The discharged-sheet tray 193 is subjected to vertical movement control by a motor (not shown), and is moved to the position of the processing tray 194 before starting an image processing operation. A sheet tray 191 mounts delimiting sheets to be inserted between discharged transfer sheets. A Z-folding machine 195 performs Z-folding of discharged transfer sheets. A binding machine 196 performs binding by folding a copy of discharged transfer sheets along a center line and stapling the folded transfer sheets. The bound bundle is discharged onto a discharged-sheet tray 197.

Figure 5:
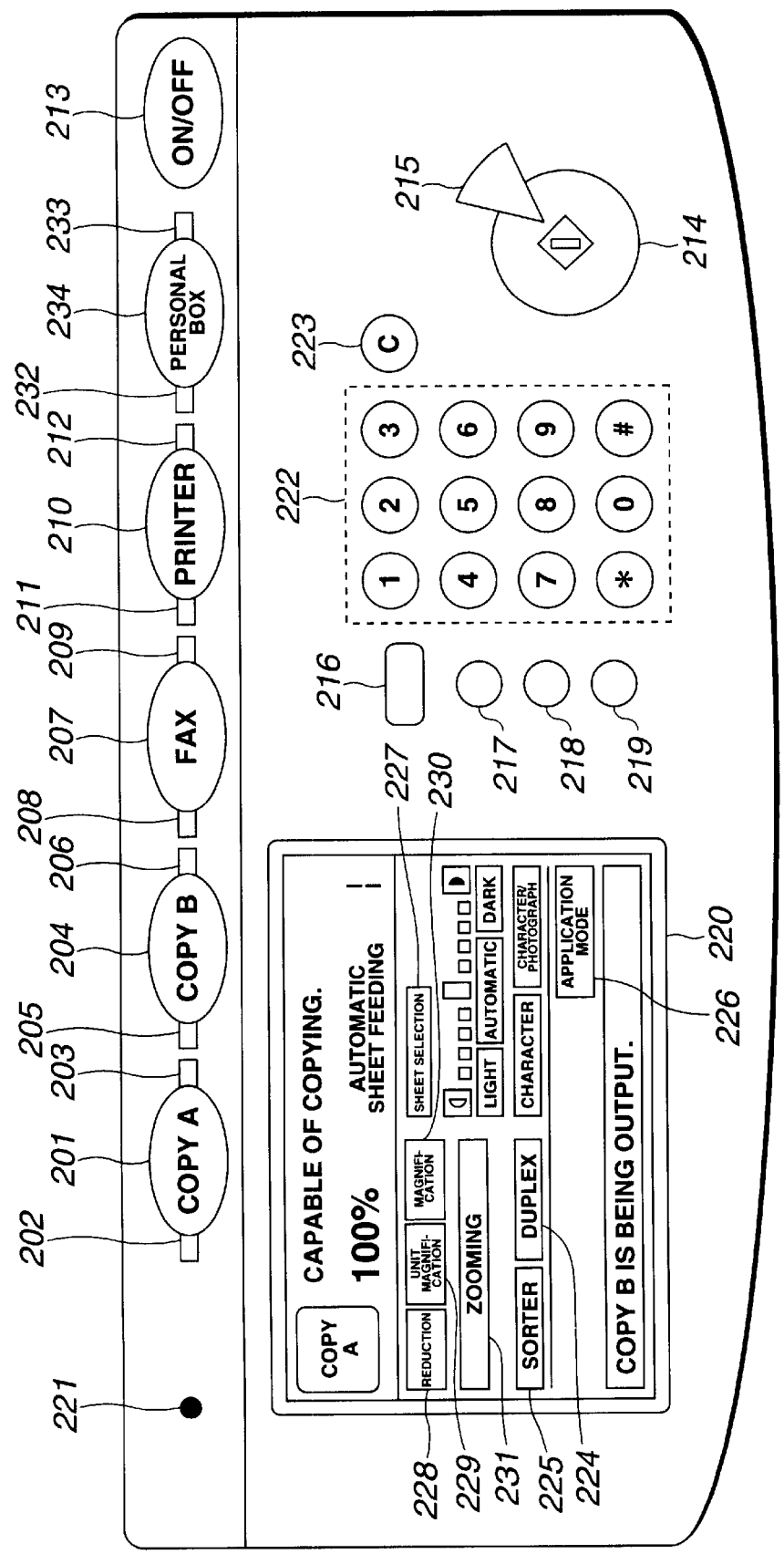
FIG. 5 is a diagram illustrating external appearance of an operation unit 22 shown in FIG. 1.

FIG. 5 is a diagram illustrating external appearance of the operation unit 22 shown in FIG. 1.

In FIG. 5, each of keys 201–212 and 234, each having an LED (light-emitting diode) display, is provided for switching display on the operation unit 22 in order to set the corresponding function relating to a copying operation or a system operation of the main body of the copier 10. Each of the keys 201, 204, 207, 210 and 234 is used for switching the corresponding function. Each of the keys is configured by a semitransparent key button, and a display lamp (not shown), such as an LED or the like, is provided within the key. When an operational picture frame is selected by depressing one of these keys, the lamp within the key is lit. Only the lamp within the key corresponding to the selected operational picture frame is lit, and lamps within other keys are not lit.

Green LED lamps 203, 206, 209, 212 and 233 are disposed at the right of the keys 201, 204, 207, 210 and 234, respectively. Each of these LED lamps indicates the state of operation of the corresponding function with lighting of the LED. For example, the LED lamp 206 for copy B is not lit when copy B is in a standby state, and is flashed when copy B is performing an output operation. When the image of copy B is preserved on the hard disk 13d of the image memory unit 13 and a printing operation for copy B is not performed, the LED lamp 206 is lit. Similarly, for example, the LED lamp 209 for facsimile is flashed during a communication operation, a printing operation or a reading operation, and is lit when a facsimile image is present on the hard disk 14b of the facsimile unit 14a.

Red LED lamps 202, 205, 208, 211 and 232 are disposed at the left of the keys 201, 204, 207, 210 and 234, respectively. Each of these LED lamps indicates occurrence of an abnormal state in the corresponding function with lighting of the LED. For example, the LED lamp 205 for copy B is flashed when an abnormality, such as interruption due to absence of sheets, a sheet jam or the like, has occurred. At that time, by depressing the copy-B function key 204 in order to switch display on the operation unit 2 to copy B, the state of copy B is displayed on the display panel 220, so that the details of the abnormal state can be confirmed.

These function keys 201, 204, 207, 210 and 234 can be depressed irrespective of the operational states of the corresponding functions, so that the operation unit 22 can be switched. When the copy-A function and the copy-B function can be switched as in the first embodiment, keys which are not provided within the display panel 220, such as a start key 214, a stop key 215, a reset key 216 and the like (to be described below), are operated for a function selected by the function switching key 201 or 204. For example, even if the stop key 215 is depressed when the picture frame for operating copy A is displayed while copy B is performing an output operation, a copying operation cannot be stopped for the output operation of copy B. A copying operation of copy B is stopped by depressing the stop key 215 after depressing the copy-B function key 204.

Data set through a user setting key 218 is present on each picture frame where copy A or copy B is selected, and a setting operation can be independently performed in each picture frame.

A lamp 221 is turned on/off in accordance with the on/off state of the power supply by a power switch 213. A ten-digit keypad 222 is used when inputting a numerical value in order to set the number of copies or a mode. A clear key 223 is used for clearing setting input through the ten-digit keypad 222. A reset key 216 is used when returning a mode, such as the set number of copies, the operation mode, the selected sheet feeding stage or the like, to a predefined value.

By depressing the start key 214, an image forming operation is started. Red and green LED lamps (not shown) indicating whether or not an image forming operation can be started are provided at the center of the start key 214. When an image forming operation cannot be started, or during a copying operation, the red LED lamp is lit, and when an image forming operation can be started, the green LED lamp is lit. The stop key 215 is used when intending to stop a copying operation.

Reference numeral 217 represents a guide key. If another key is depressed after depressing the guide key 217, the description of the function capable of being set by that key is displayed on the display panel 220. When intending to release this guide display, the guide key 217 is again depressed. Reference numeral 218 represents a user setting key. By depressing the user setting key 218, the user can change the setting of the main body of the copier 10. Settings which can be changed by the user are, for example, the time until setting is automatically cleared, and a predefined value for a mode when the reset key 216 is depressed.

When an interrupt key 219 is depressed during an image forming operation, the image forming operation is interrupted, and a copying operation can be performed without using the automatic original-feeder 100.

The display panel 220 is configured by a liquid crystal and the like. The contents of display on the display panel 220 are changed in accordance with a setting mode, in order to facilitate detailed mode setting. The surface of the display panel 220 is configured by a touch sensor. In FIG. 5, keys 224–231 are displayed within the display panel 220. When the display position of each key is manually touched, it is determined that the key has been depressed, and the corresponding mode is set. A key 227 is for selecting a sheet cassette. Keys 228–231 are for setting a copying magnification in a copying operation. Reference numeral 226 represents a key for setting an application mode. By depressing this key 226, a picture frame for setting applicational function modes, such as a pamphlet mode in which printing is performed in an order suitable for forming a pamphlet, a cover/combined sheet mode for inserting a cover and combined sheets in printing sheets, and the like, a reduced-layout mode and a magnified-layout mode, and setting keys for respective applicational function modes are displayed, in order to allow setting of an application mode.

Operations for setting various modes of the digital copier of the first embodiment having the above-described configuration will now be specifically described.

Operation of Setting Simplex→Duplex Printing in Duplex Printing

First, an operation of setting simplex→duplex printing in duplex printing will be described with reference to FIGS. 6–10. Duplex printing indicates printing on both surfaces of a sheet material, such as paper or the like. "Simplex→duplex printing" indicates printing of images that are on respective single surfaces of two originals, onto the two surfaces of a single sheet of material in duplex printing.

Figure 6:
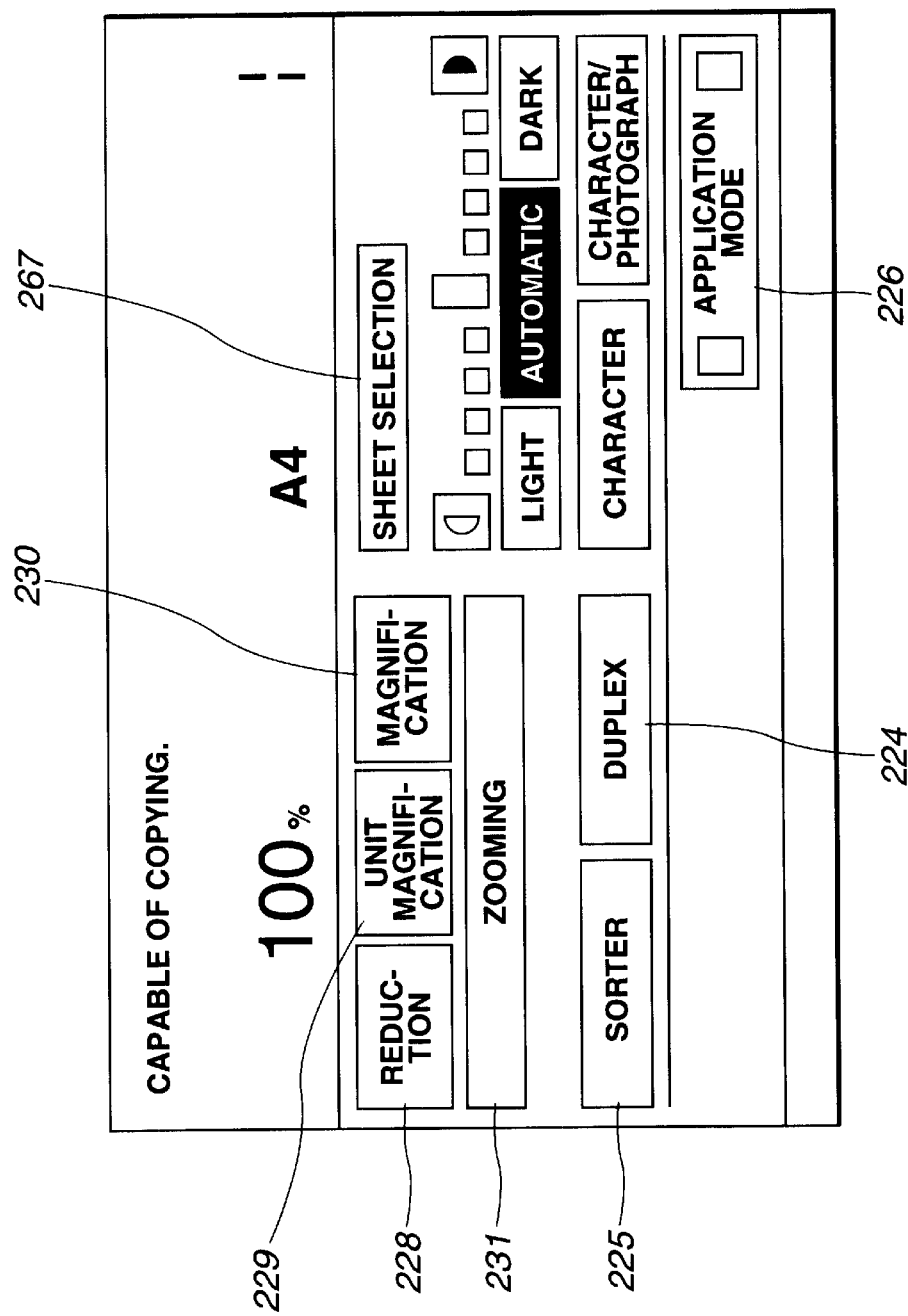
FIG. 6 is a diagram illustrating a basic picture frame of a display panel 220 shown in FIG. 5.

FIG. 6 illustrates a basic picture frame on the display panel 220. By depressing the duplex-printing setting key 224 on this picture frame, a picture frame for setting a duplex mode as shown in FIG. 7 is provided. On the duplex-mode setting picture frame shown in FIG. 7, if, for example, a simplex→duplex printing key 514 is depressed, the key 514 is subjected to black-and-white reversal display, and a state of selection is provided. By depressing an OK key 519 in this state, a picture frame shown in FIG. 8 for setting a manner of opening for copies of simplex→duplex printing (a duplex-printing-mode setting picture frame) is provided, in order to select one of right/left opening and up/down opening.

Figure 9A:
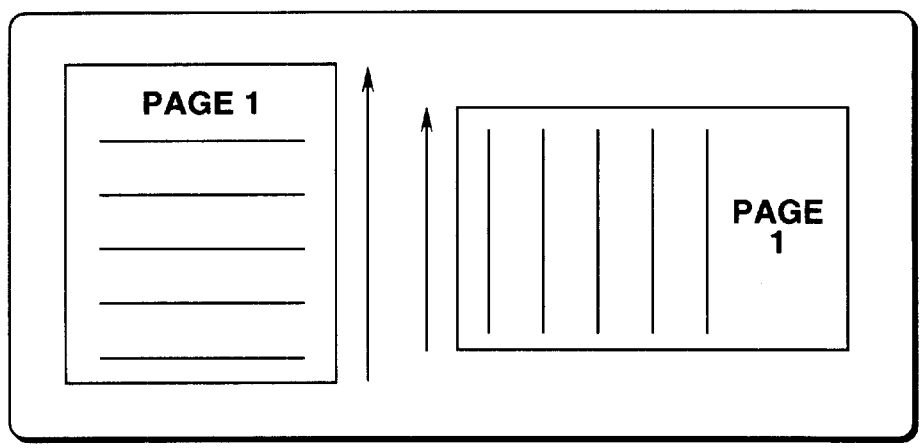
FIGS. 9A–9C are diagrams illustrating right/left opening and up/down opening states of recording corresponding to the directions of respective documents.
Figure 9B:
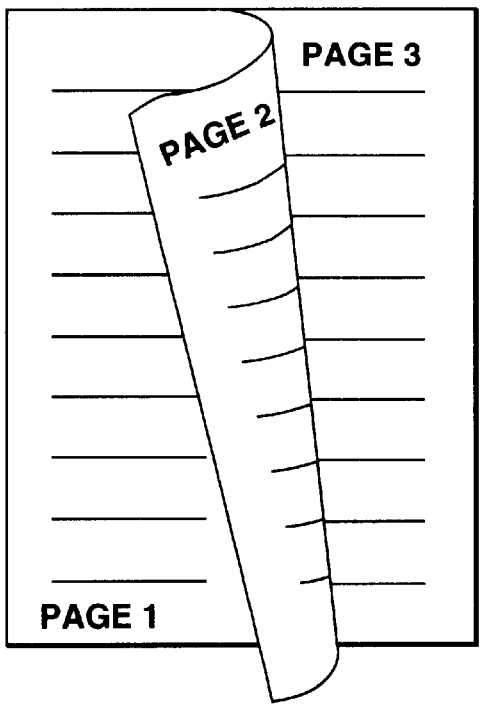
Figure 9C:
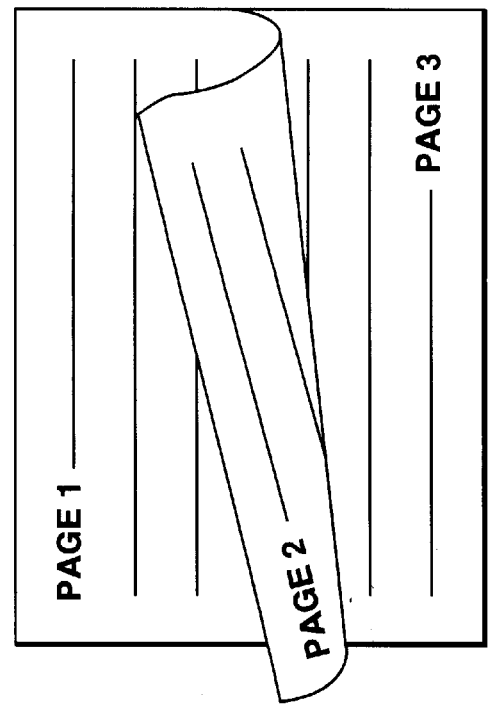

In the first embodiment, the direction of document is defined as shown in FIG. 9A. "Right/left opening" indicates a state of opening printed sheets to the right and left with respect to the properly-oriented document, such as in the case of a book, as shown in FIG. 9B. "Up/down opening" indicates a state of opening printed sheets up and down with respect to the properly-oriented document, such as in the case of a calendar, as shown in FIG. 9C.

When a right/left-opening setting key 520 is depressed, the key 520 is subjected to black-and-white reversal display, and a state of selecting right/left opening is provided. When an up/down-opening setting key 521 is depressed, the key is also subjected to black-and-white reversal display (not shown), and a state of selecting up/down opening is provided. When intending to interrupt simplex→duplex printing, the picture frame is switched to the picture frame shown in FIG. 7 by depressing a cancel key 522.

Figure 10:
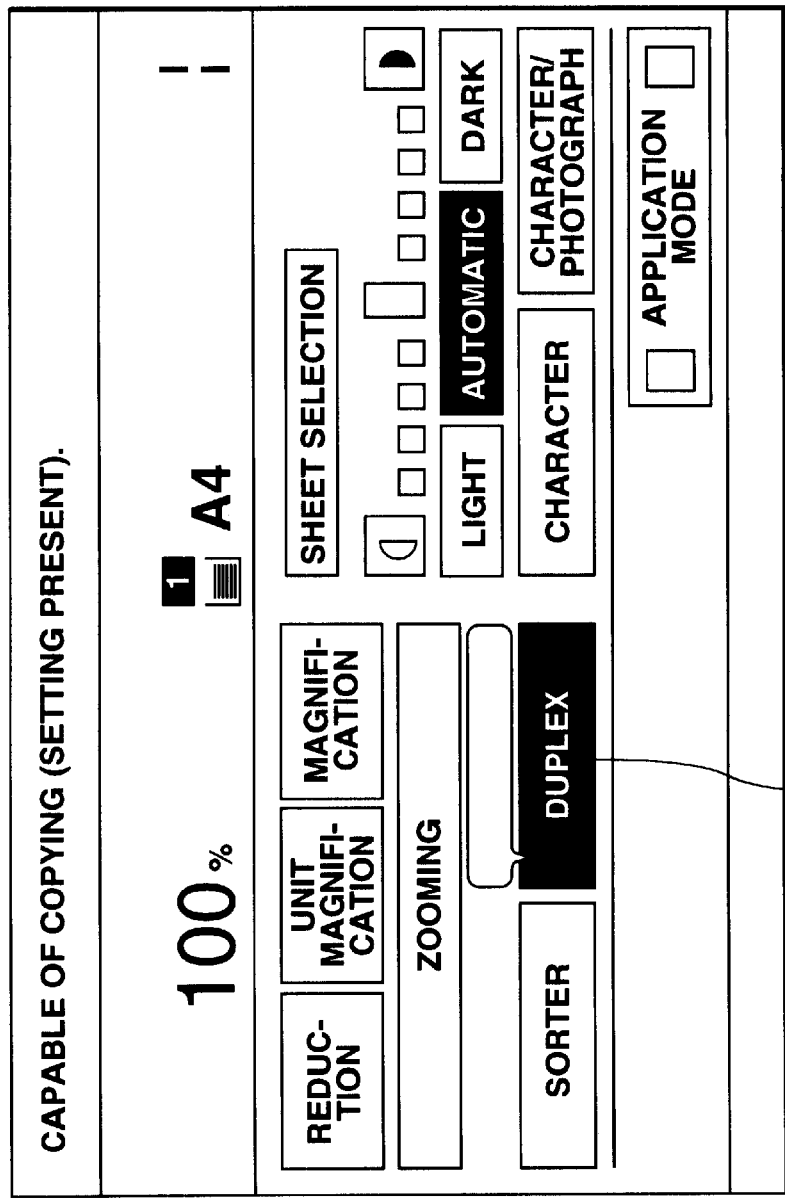
FIG. 10 is a diagram illustrating a picture frame on which duplex printing has been set.

When one of the keys 520 and 521 is selected, and an "OK" key 523 is depressed, the duplex printing key 224 is subjected to black-and-white reversal display as shown in FIG. 10, and a picture frame indicating completion of setting of duplex printing is provided. By depressing the start key 214 in this state, a copying operation is started.

It is possible to select whether or not automatic detection of the direction of the original is to be performed, using a button 524 on the picture frame shown in FIG. 8. When the button 524 is subjected to black-and-white reversal display by being depressed, the setting of detecting the direction of the original is provided. When the button 524 is again depressed in the state in which the button 524 is subjected to black-and-white reversal display, the reversal display of the button 524 is released, and the setting of not performing detection of the direction of the original is provided.

Setting Operation when Selecting a Reduced Layout

Next, the flow of an operation when a reduced-layout mode (an Nin1 mode) is selected on the application picture frame shown in FIG. 11 will be described in detail.

Figure 11:
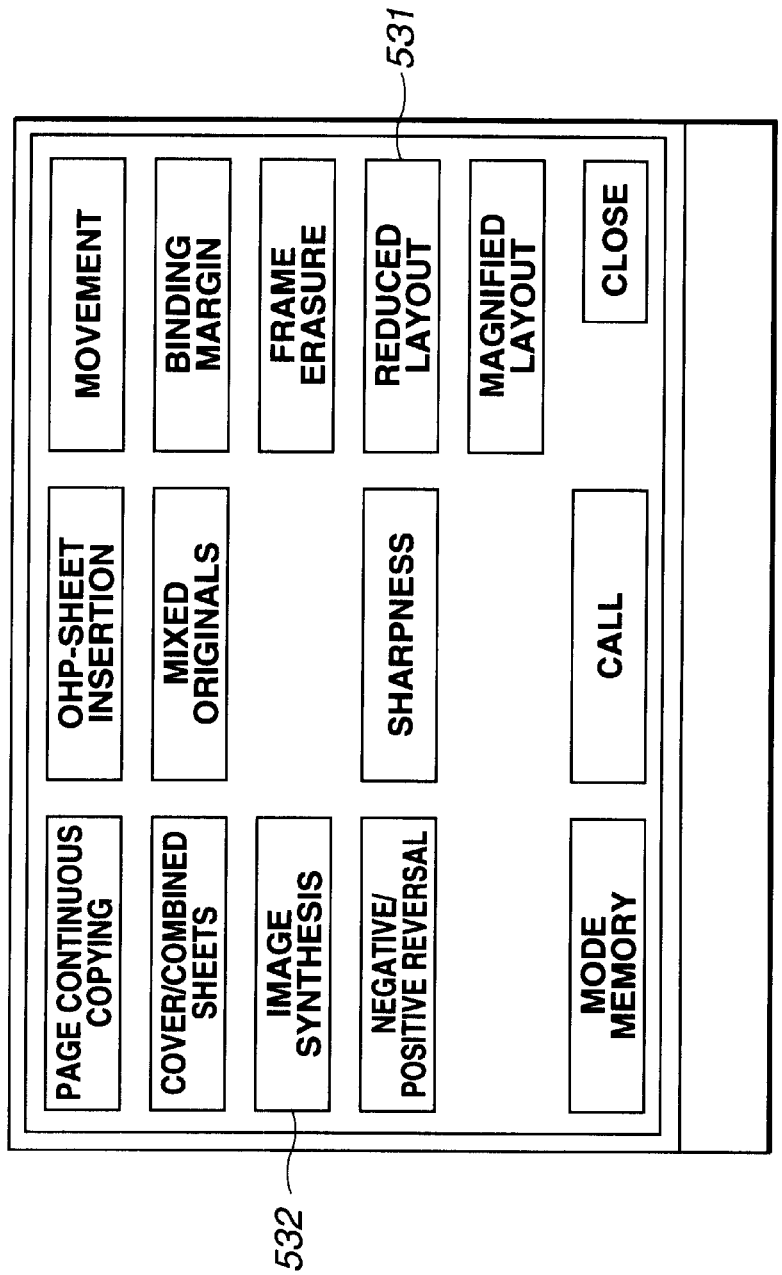
FIG. 11 is a diagram illustrating an applicational picture frame.
Figure 12:
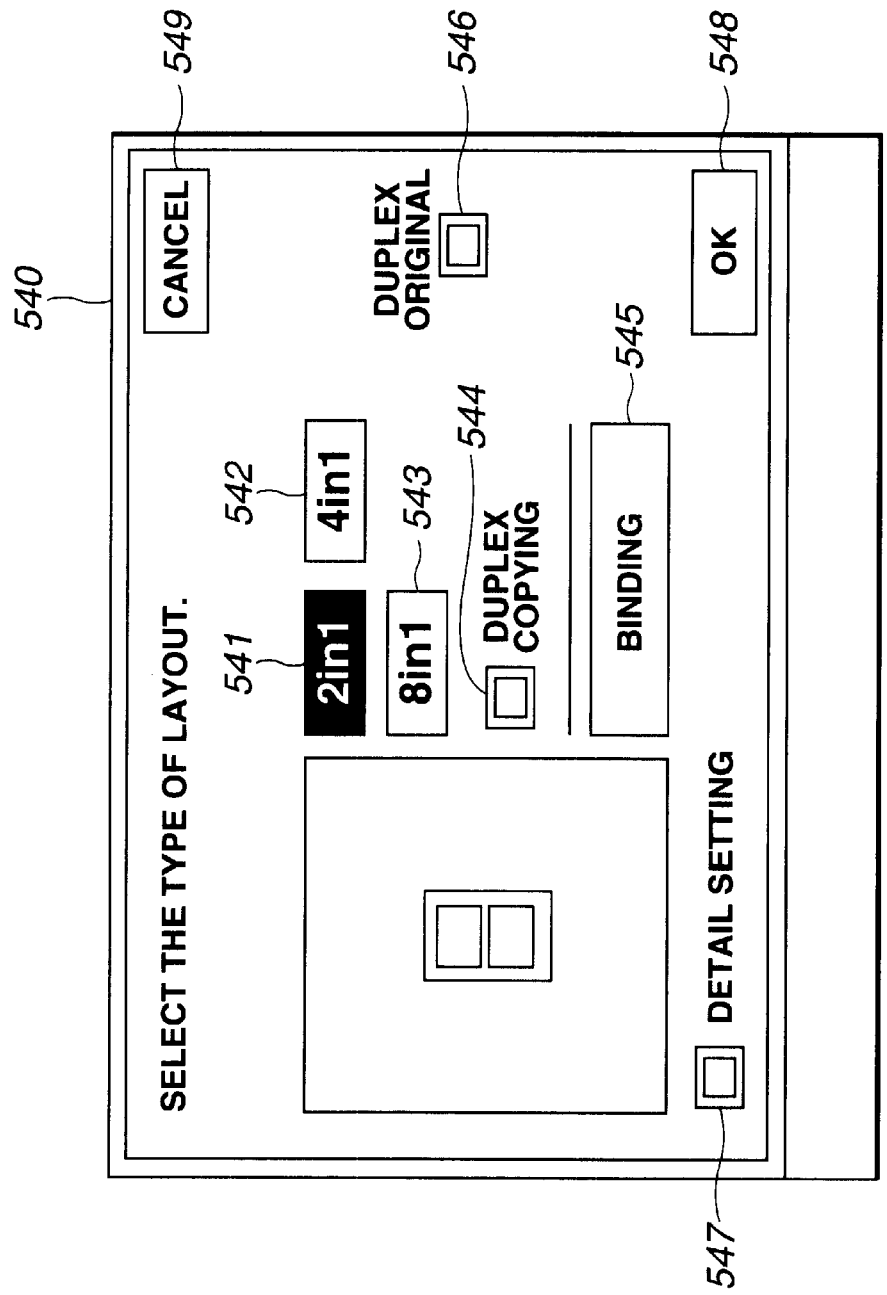
FIG. 12 is a diagram illustrating a picture frame for layout selection.

When a reduced-layout mode is selected by depressing a button 531 on the picture frame shown in FIG. 11, a picture frame for selecting the size of the original (not shown) is displayed. When the size of the original is assigned on this selection picture frame, as shown in FIG. 12, a layout selection picture frame 540 for selecting the type of layout is displayed. In FIG. 12, a 2in1 button 541, a 4in1 button 542 and an 8in1 button 543 are each for selecting the type of layout.

When the 2in1 button 541 is depressed, this effects a setting for forming images by automatically reducing the size of the read originals for two pages and outputting reduced images on a selected sheet. When the 4in1 button 542 is depressed, setting is effected for forming images by automatically reducing the size of the read originals for four pages and outputting reduced images on a selected sheet. When the 8in1 button 543 is depressed, the apparatus is set to form images by automatically reducing the size of the read originals for eight pages and outputting reduced images on a selected sheet.

Figure 13:
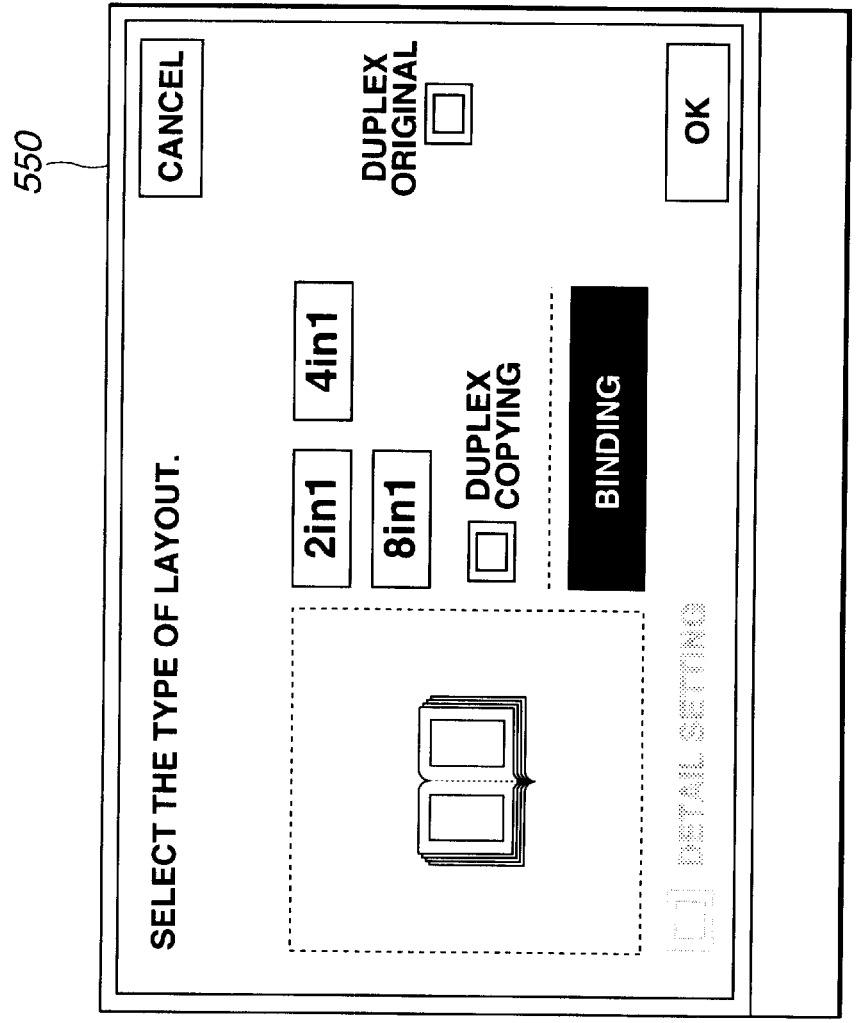
FIG. 13 is a diagram illustrating a picture frame when binding has been selected on the layout-selection picture frame shown in FIG. 12.

A duplex-original button 546 is for reading images on both surfaces of an original. When this button 546 is depressed, the automatic original-feeder 100 can scan both surfaces of an original. A duplex button 544 is for performing duplex setting. When this button 544 is depressed, duplex output is performed. A binding button 545 is for setting a pamphlet mode. When this button 545 is depressed, copies are output in a pamphlet mode. A cancel key 549 is for cancelling the reduced-layout mode. When this key 549 is depressed, the picture frame returns to the application picture frame shown in FIG. 11. When the binding button 545 is depressed on the picture frame 540 shown in FIG. 12, then, as shown in the picture frame shown in FIG. 13, a detail-setting button 547 is subjected to halftone dot meshing to prohibit setting using the detail-setting button 547.

Figure 14:
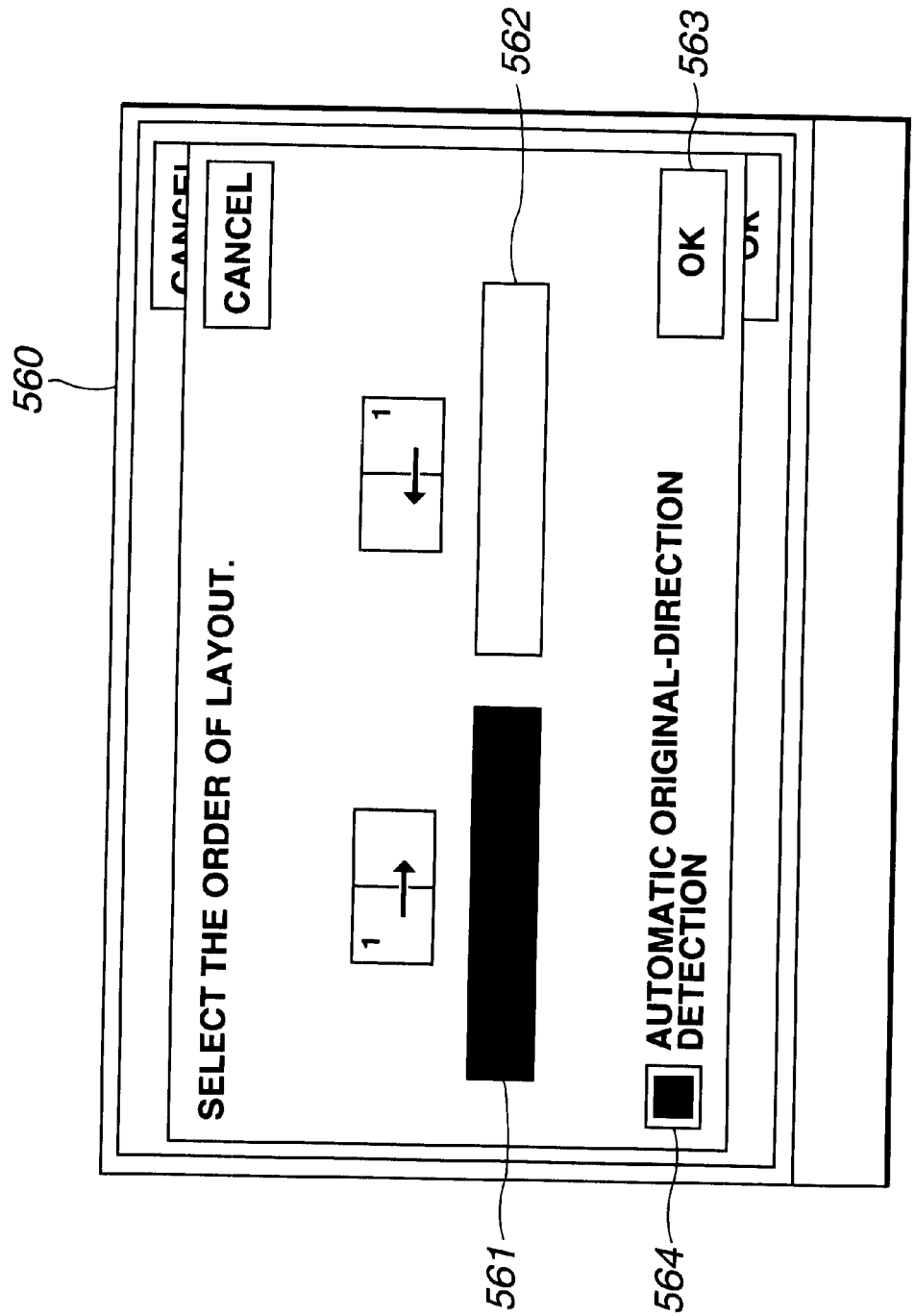
FIG. 14 is a diagram illustrating a picture frame for setting the order of 2 in 1 layout.

On the picture frame 540 shown in FIG. 12, when the detail-setting button 547 is depressed in a state in which the 2in1 button 541 is selected and the binding button 545 is not depressed, a 2in1-layout-order setting picture frame 560 shown in FIG. 14 is displayed.

Buttons 561 and 562 on the picture frame 560 are each for selecting the order of image formation of read images on a recording sheet. When the button 561 is depressed and a reading "OK" key 563 is depressed, the selected order of layout is set, and the picture frame returns to the picture frame 540 for selecting the type of reduced layout shown in FIG. 12. When the start key 214 is depressed after depressing an "OK" key 548 on the picture frame 540 and selecting an output sheet, a reduced layout is output with the set type of layout and in the set order of layout.

Figure 15:
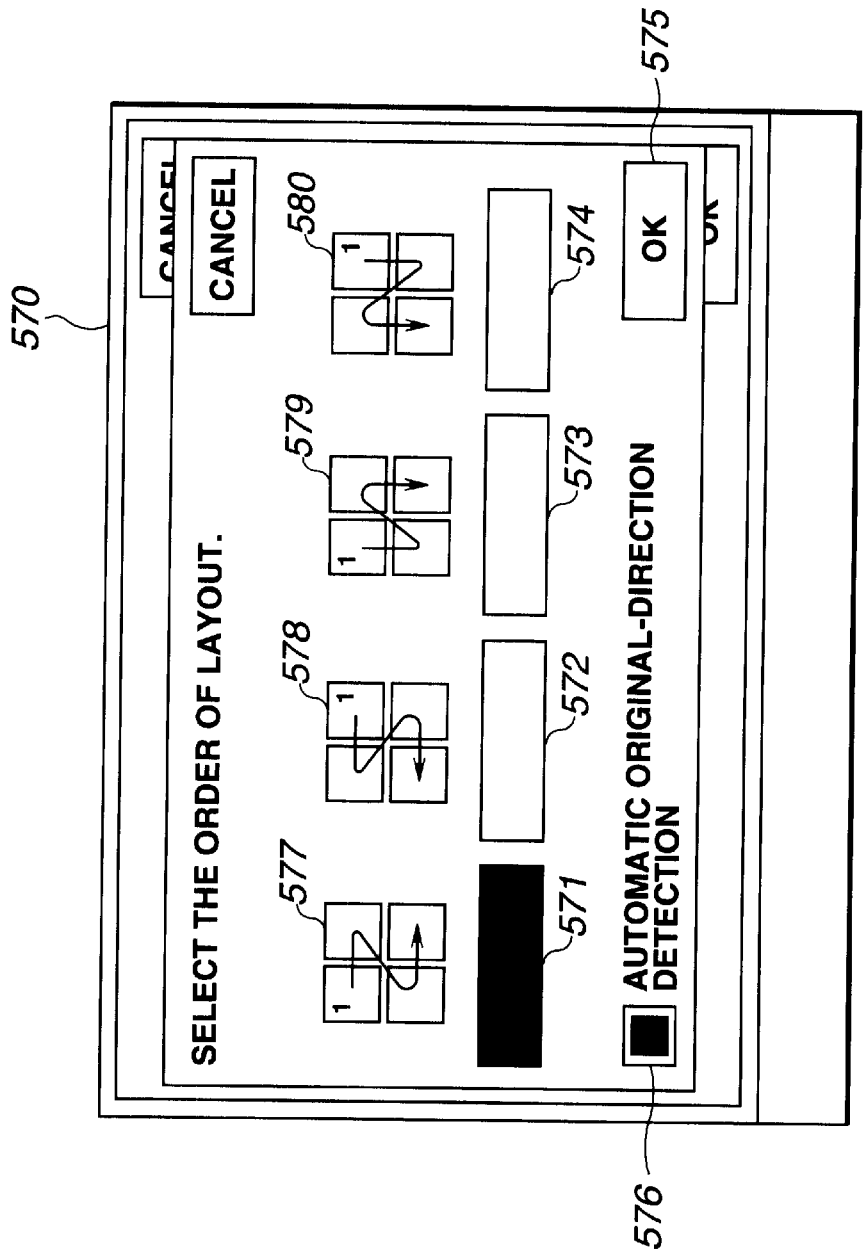
FIG. 15 is a diagram illustrating a picture frame for setting the order of Nin1 layout.

When the detail-setting button 547 is depressed in a state in which the 4in1 button 542 or the 8in1 button 543 has been selected on the reduced-layout-type selection picture frame 540 shown in FIG. 12, an Nin1-layout-order selection picture frame 570 shown in FIG. 15 is displayed.

One of four layout orders can be selected using buttons 571–574. For example, when performing layout by reading four originals, if the button 571 is selected, layout is performed so that the first, second, third and fourth pages of originals are laid out to the upper left, upper right, lower left and lower right portions of the sheet, respectively (this layout will be termed a "Z-type reduced layout"). If the button 572 is selected, layout is performed so that the first, second, third and fourth pages of originals are laid out to the upper right, upper left, lower right and lower left portions of the sheet, respectively (this layout will be termed an "inverse-Z-type reduced layout"). If the button 573 is selected, layout is performed so that the first, second, third and fourth pages of originals are laid out to the upper left, lower left, upper right and lower right portions of the sheet, respectively (this layout will be termed an "inverse-N-type reduced layout"). If the button 574 is selected, layout is performed so that the first, second, third and fourth pages of originals are laid out to the upper right, lower right, upper left and lower left portions of the sheet, respectively (this layout will be termed an "N-type reduced layout").

It is possible to select whether or not automatic original-direction detection is to be performed using a button 576. When the button 576 is subjected to reversal display by being depressed, setting of performing automatic original-direction detection is provided. When the button 576 is again depressed in the state in which the button 576 is subjected to reversal display, the reversal display of the button 576 is released, and setting of not performing automatic original-direction detection is provided. Automatic original-direction detection is performed according to a well-known method.

When an "OK" key 575 is depressed, setting is performed in the selected order of layout, and the picture frame returns to the reduced-layout-type selection picture frame 540 shown in FIG. 12. When the start key 214 is depressed after depressing an "OK" key 548 on the picture frame 540 and selecting an output sheet, a reduced layout is output with the set type of reduced layout and in the set order of layout.

Setting Operation when Selecting a Magnified Layout

Next, the flow of the operation when a magnified layout is selected on the application picture frame shown in FIG. 11 will be described in detail with reference to FIGS. 16–20.

Figure 16:
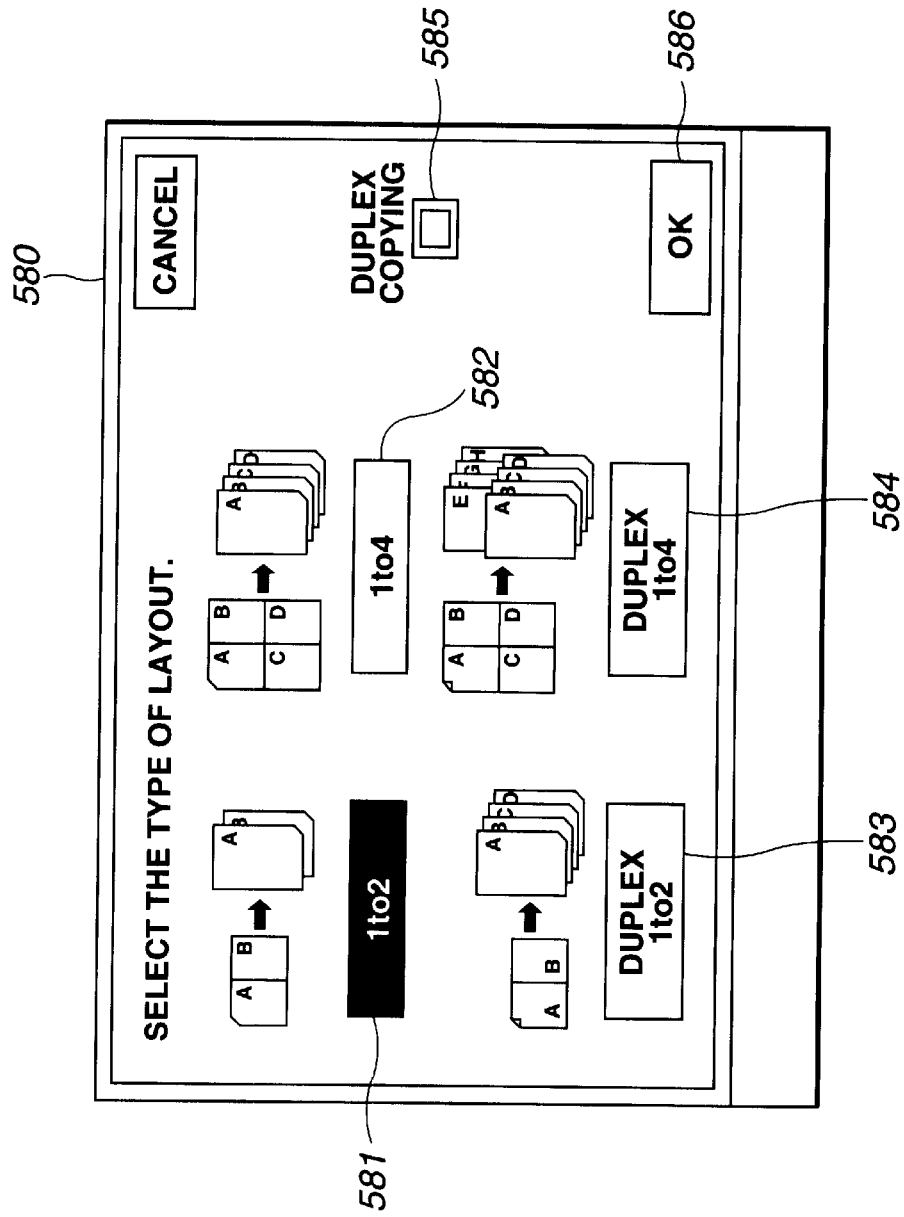
FIG. 16 is a diagram illustrating a picture frame for selecting the type of magnified layout.

When a magnified layout is selected, for example, when returning images copied with a reduced layout to a plurality of originals before being reduced, a magnified-layout-type selection picture frame 580 shown in FIG. 16 is displayed. A 1to2 button 581, a 1to4 button 582, a duplex 1to2 button 583 and a duplex 1to4 button 584 are each for selecting the type of magnified layout.

The 1to2 button 581 is a setting button for dividing a read original into left and right images, reading the two images, and forming each of the two images on an output sheet. The 1to4 button 582 is a setting button for dividing a read original into upper left, upper right, lower left and lower right images, reading the four images, and forming each of the four images on an output sheet in the order of reading. The duplex 1to2 button 583 is a setting button for dividing each of two surfaces of a duplex original into left and right images, reading the four images, and forming each of the four images on an output sheet. The duplex 1to4 button 584 is a setting button for dividing each of two surfaces of a duplex original into upper left, upper right, lower left and lower right images, reading the respective four images, and forming each of the four images on an output sheet in the order of reading. By depressing a duplex copying button 585, duplex output is set.

Figure 17:
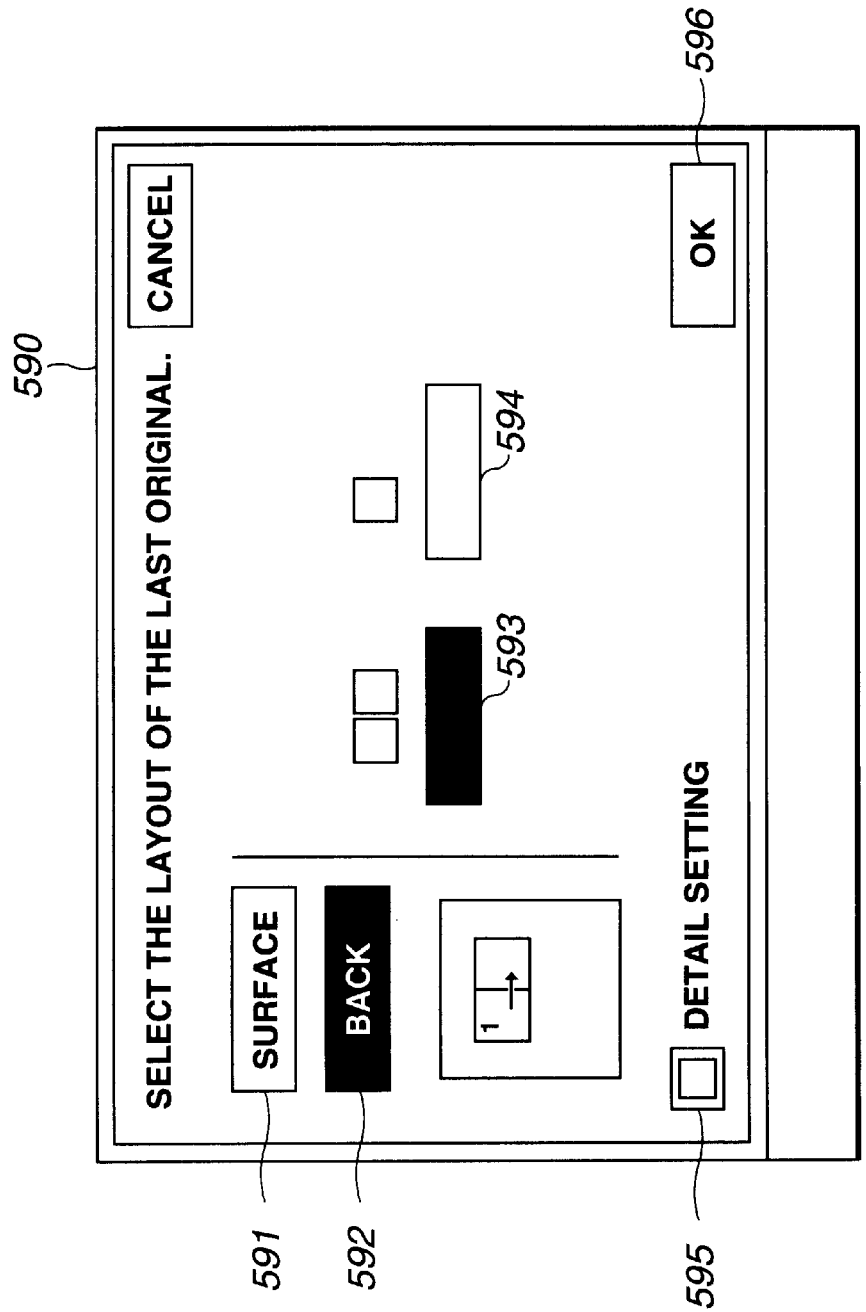
FIG. 17 is a diagram illustrating a picture frame for setting 1 to 2 layout for the last original.

When an OK key 586 is depressed after selecting the 1to2 button 581 or the duplex 1to2 button 583 on the magnified-layout-type selection picture frame 580 shown in FIG. 16, a 1to2 last-original-layout setting picture frame 590 shown in FIG. 17 is displayed.

A button 592 on this picture frame 590 is for setting whether or not the back of the last original also has an image. When a button 591 is selected, setting of not reading the back of the last original is provided. When the button 592 is selected, setting of also reading the back of the last original is provided. When the 1to2 button 581 has been selected on the magnified-layout-type selection picture frame 580 shown in FIG. 16, the button 592 shown in FIG. 17 is subjected to halftone dot meshing and cannot perform setting. Buttons 593 and 594 are for selecting whether or not there exist two images or one image on the last surface to be read of the last original (corresponding to the surface of the last original when the button 591 is set, and to the back of the last original when the button 592 is set). When the button 593 is selected, reading of two images for each original is performed for all originals. When the button 594 is selected, only one image is read from the last surface to be read of the last original. If an operation of reading two images is performed when only one image is present on the last page of the last original, a blank sheet is discharged as a result. The selection picture frame 590 is for performing setting for preventing such a problem.

Figure 18:
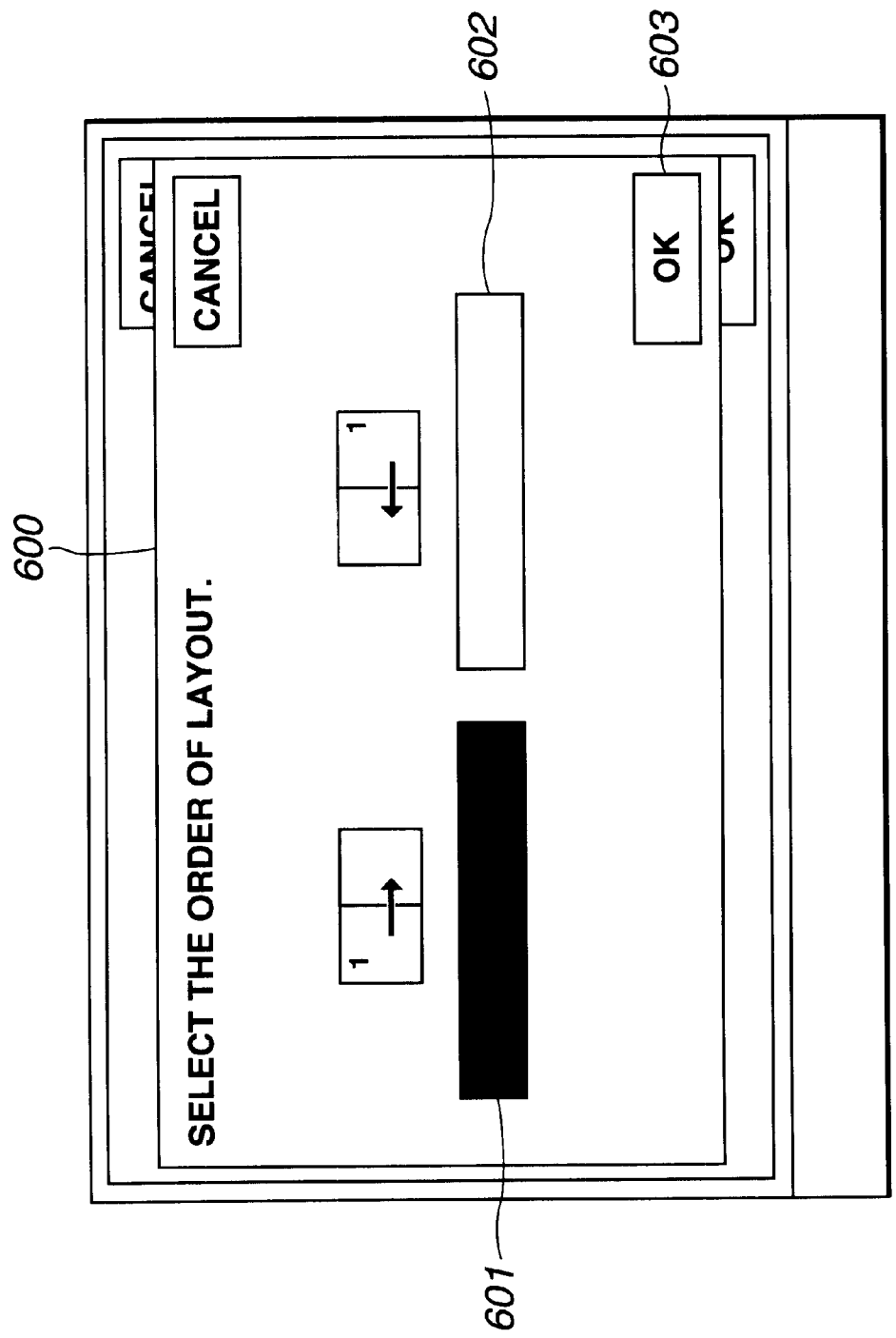
FIG. 18 is a diagram illustrating a picture frame for selecting the order of magnified layout.

Next, a description will be provided of a magnified-layout-order selection picture frame 600 shown in FIG. 18 displayed when depressing a detail setting button 595 on the 1to2 last-original-layout setting picture frame 590 shown in FIG. 17.

On the magnified-layout-order selection picture frame 600 shown in FIG. 18, each of buttons 601 and 602 is for selecting the order of reading, i.e., whether reading of an original to be read is to be performed from the left image or from the right image. When the button 601 is selected and an "OK" key 603 is depressed, setting of performing image reading from the left image is provided (this layout will be termed a "left-to-right-type magnified layout"). When the button 602 is selected and the "OK" key 603 is depressed, setting of performing image reading from the right image is provided (this layout will be termed a "right-to-left-type magnified layout"). When the "OK" key 603 is depressed, the picture frame returns to the application picture frame shown in FIG. 11. When the start key 214 is depressed in this state, image reading is performed in the set conditions, and images are output in the order of reading. Initial setting is a state in which the button 601 is selected.

Figure 19:
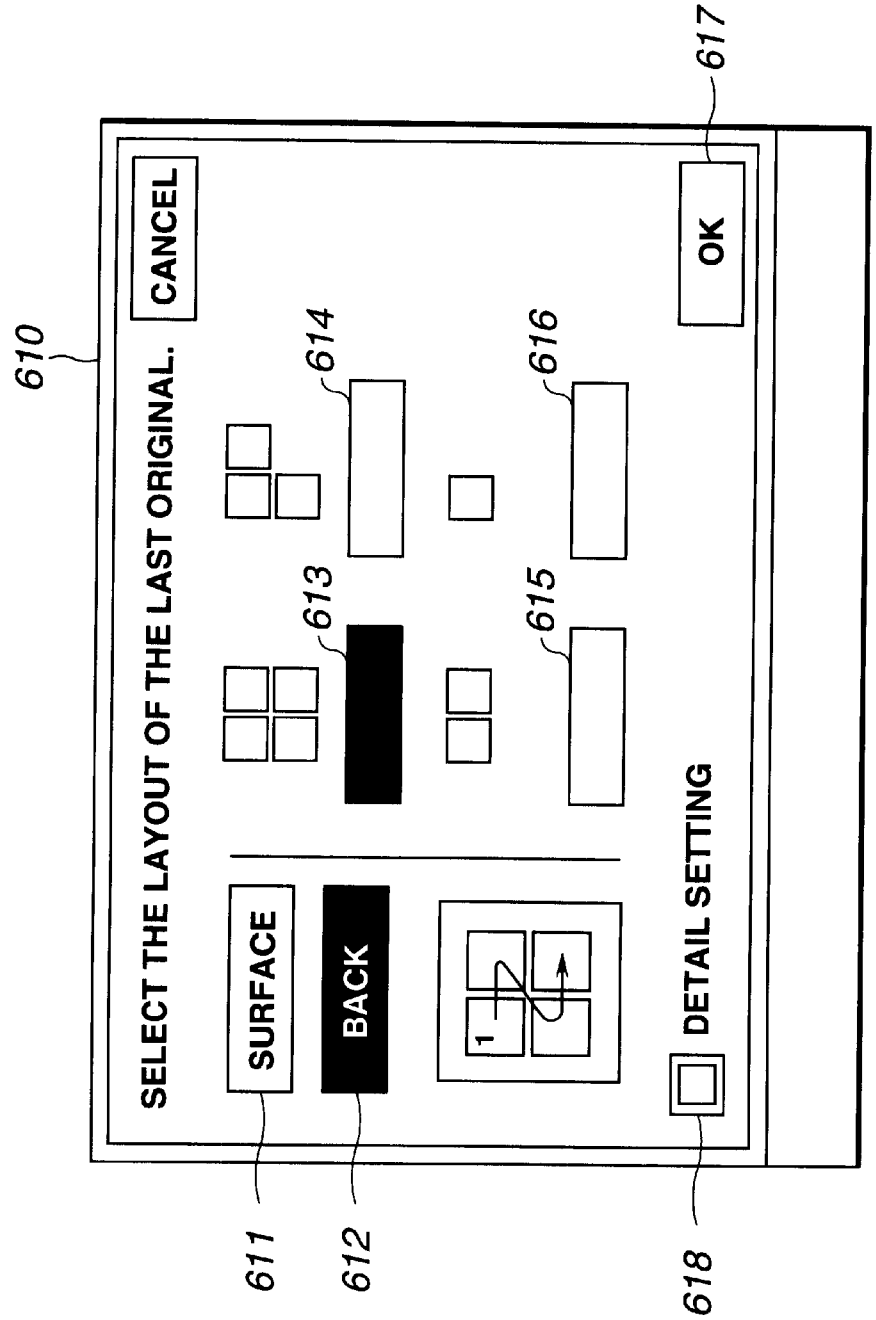
FIG. 19 is a diagram illustrating a picture frame for setting 1to4 layout for the last original.

Next, a description will be provided of a 1to4 last-original-layout selection picture frame 610 displayed when the 1to4 button 582 or the duplex 1to4 button 584 is selected, and the "OK" key 586 is depressed on the magnified-layout-type selection picture frame 580 shown in FIG. 16, with reference to FIG. 19.

In FIG. 19, buttons 611 and 612 are the same as the buttons 591 and 592 shown in FIG. 17, respectively. The picture frame 601 shown in FIG. 19 is for setting whether or not an image is also present on the back of the last original. The button 611 is selected to set that the back of the last original is not to be read. The button 612 is selected to set that the back of the last original is to be read. When the 1to4 button 582 has been selected on the magnified-layout-type selection picture frame 580 shown in FIG. 16, the button 612 is subjected to halftone dot meshing, and cannot be used to perform setting.

Buttons 613, 614, 615 and 616 shown in FIG. 19 are for selecting how many images are present on the last surface to be read of the last original (corresponding to the surface of the last original when the button 611 is set, and to the back of the last original when the button 612 is set). When the button 613 is selected, four images are read for each of all originals. When the button 614 is selected, three images are read each original. When the button 615 is selected, two images are read for each original. When the button 616 is selected, one image is read for each original.

Figure 20:
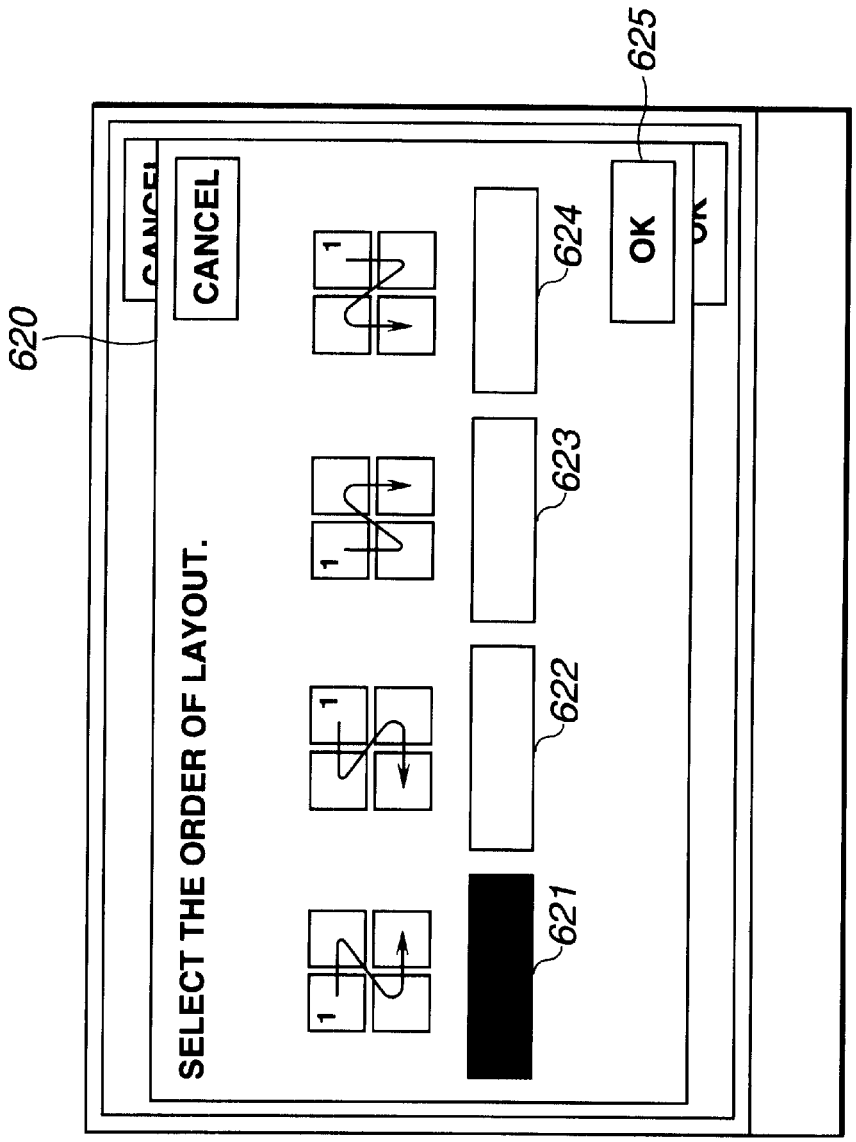
FIG. 20 is a diagram illustrating a picture frame for selecting the order of magnified layout.

Next, a description will be provided of a magnified-layout-order selection picture frame 620 shown in FIG. 20, displayed when a detail-setting button 618 is depressed on the 1to4 magnified-layout-type selection picture frame 610 shown in FIG. 19.

Buttons 621, 622, 623 and 624 shown in FIG. 20 are for selecting the order of reading for the upper left, lower left, upper right and lower right images of an original to be read. The button 621 is selected and an "OK" key 675 is depressed to set that the original is to be read in the order of the upper left image→the upper right image→the lower left image→the lower right image (this layout will be termed a "Z-type magnified layout"). The button 622 is selected and the "OK" key 625 is depressed to set that the original is to be read in the order of the upper right image→the upper left image→the lower right image→the lower left image is provided (this layout will be termed an "inverse-Z-type magnified layout"). The button 623 is selected and the "OK" button 625 is depressed to set that the original is to be read in the order of the upper left image→the lower left image→the upper right image→the lower right image (this layout will be termed an "inverse-N-type magnified layout"). The button 624 is selected and the "OK" key 625 is depressed to set that the original is to be read in the order of the upper right image→the lower right image→the upper left image→the lower left image (this layout will be termed an "N-type magnified layout").

When the "OK" key 625 is depressed, the picture frame returns to the application picture frame shown in FIG. 11. When the start key 214 is depressed in this state, image reading is performed in the set conditions, and images are output in the order of reading. The order of image reading may be identical irrespective of the type of layout, each read image may be stored in the image memory unit 13, and the order of image output may be changed in accordance with the selected layout.

The operations of the first embodiment will now be described with reference to the flowcharts shown in FIGS. 21–24.

Figure 21:
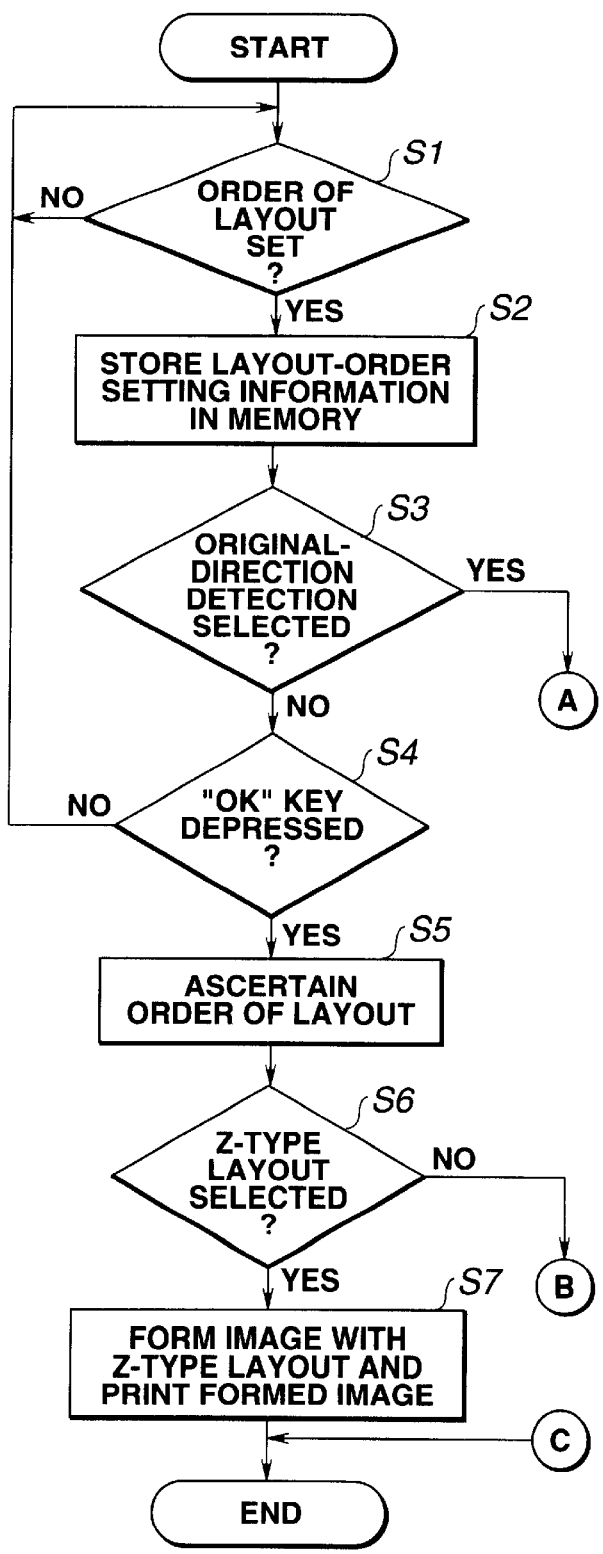
FIGS. 21–24 are flowcharts illustrating a control operation (a reduced-layout mode) in the first embodiment.
Figure 22:
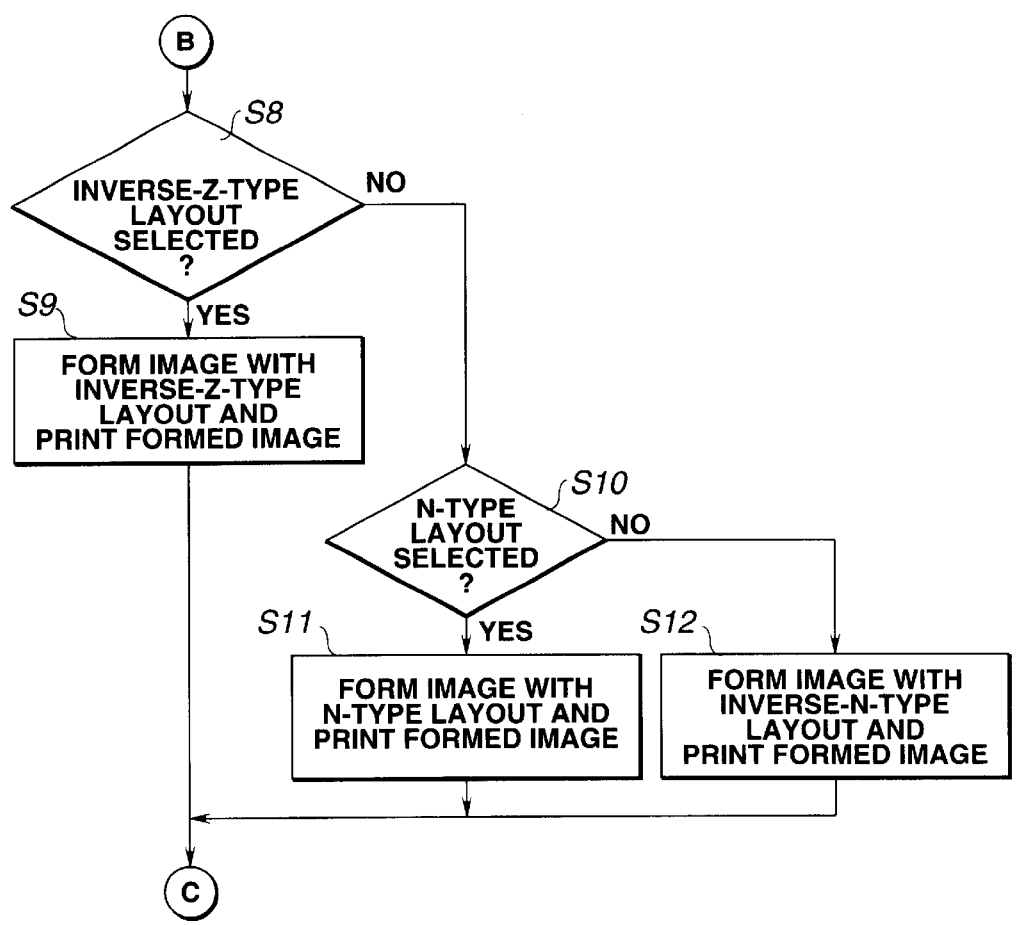

FIGS. 21 and 22 are flowcharts illustrating the operation when a 4in1 layout is selected in reduced layout.

First, it is determined if one of the four types (i.e., the Z-type, the inverse-Z-type, the inverse-N-type, and the N-type) has been selected on the layout-order selection picture frame 570 shown in FIG. 15 (step S1). If the result of the determination in step S1 is affirmative, setting information for the selected layout is stored in the memory (step S2). Then, it is determined if original-direction detection is set (step S3). If the result of the determination in step S3 is negative, it is then determined if the "OK" key 575 has been depressed on the layout-order selection picture frame 570 shown in FIG. 15 (step S4). If the result of the determination in step S4 is negative, the process returns to step S1.

If the result of the determination in step S4 is affirmative, the setting information stored in the memory in step S2 is ascertained (step S5). Then, it is determined if the setting information ascertained in step S5 indicates output of a Z-type layout (step S6). If the result of the determination in step S6 is affirmative, image formation is performed by laying out read images in the form of a "Z", the resultant image is printed (step S7), and the process is terminated.

If the result of the determination in step S6 is negative, it is then determined if an inverse-Z-type layout has been selected (step S8). If the result of the determination in step S8 is affirmative, image formation is performed by laying out read images in the form of an inverse "Z", the resultant image is printed (step S9), and the process is terminated.

If the result of the determination in step S8 is negative, it is then determined if an N-type layout has been selected (step S10). If the result of the determination in step S10 is affirmative, image formation is performed by laying out read images in the form of an "N", the resultant image is printed (step S11), and the process is terminated.

If the result of the determination in step S10 is negative, image formation is performed by laying out read images in the form of an inverse "N", the resultant image is printed (step S12), and the process is terminated.

The copying magnification at each layout is automatically determined from the selected original-size and the selected sheet size. However, the copying magnification may be manually selected.

Figure 23:
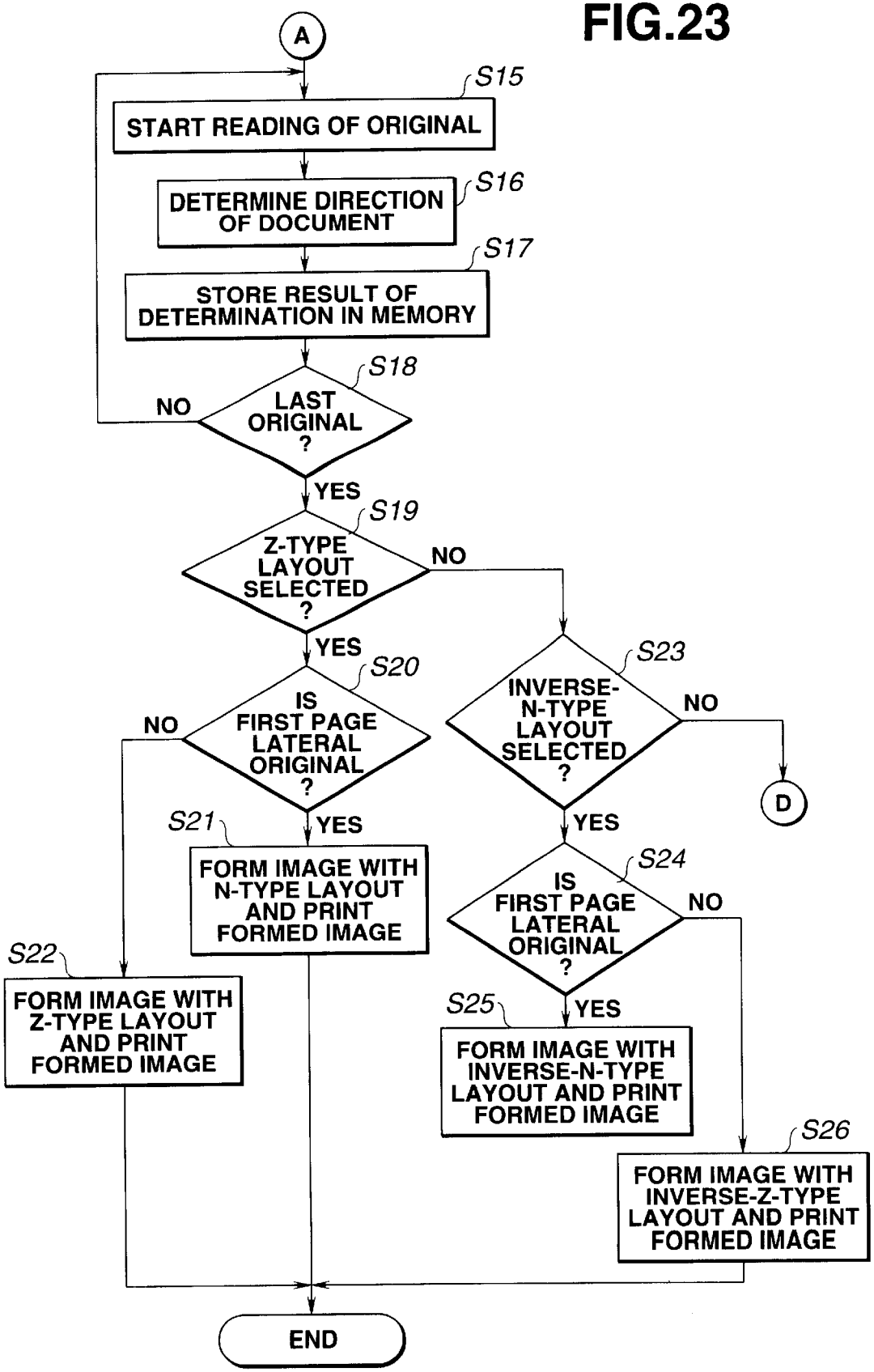
Figure 24:
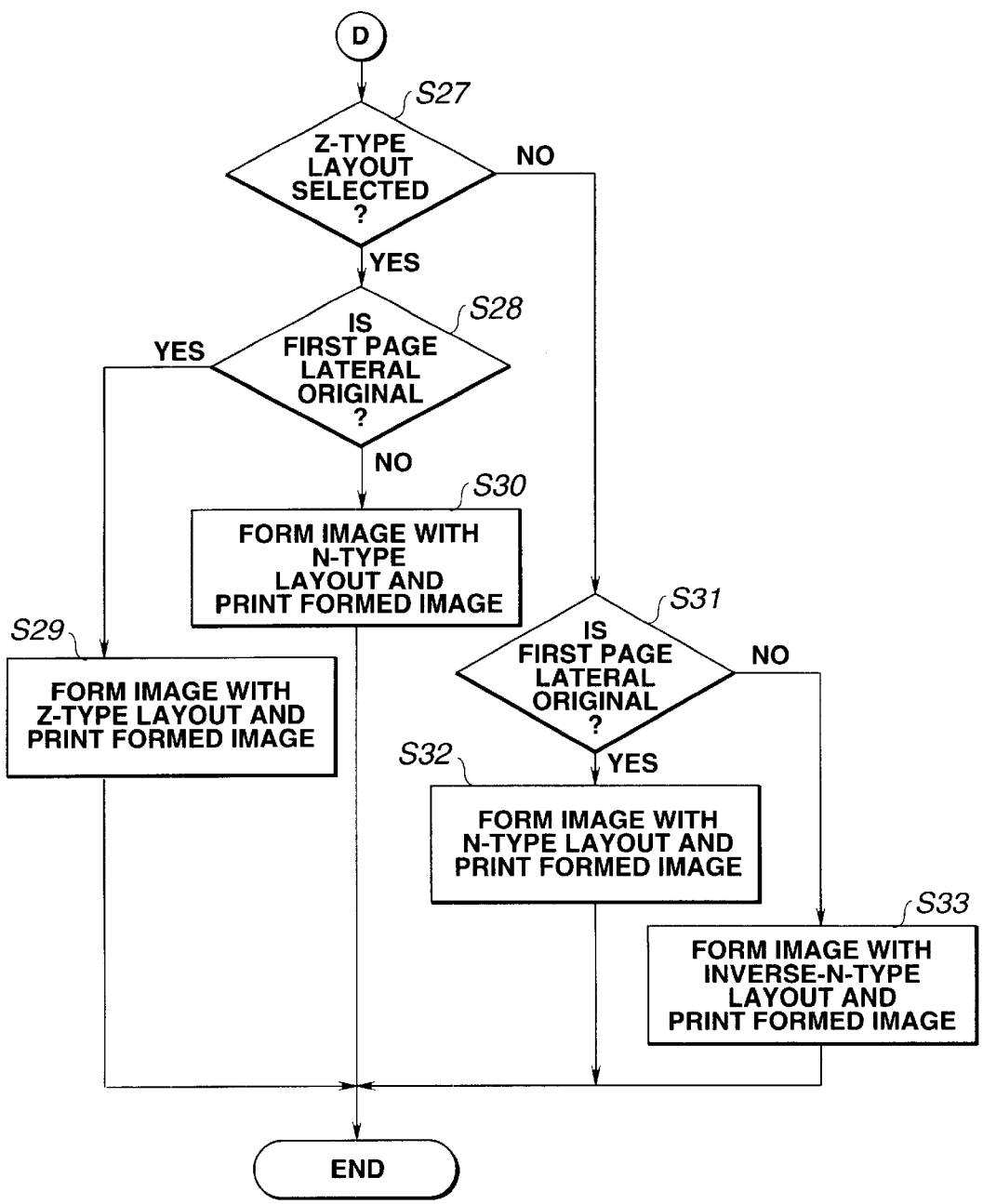

Next, a description will be provided of a case in which original-direction detection has been set in the above-described step S3, with reference to the flowcharts shown in FIGS. 23 and 24.

If the result of the determination in step S3 shown in FIG. 21 is affirmative, reading of the original is started (step S15). Then, the direction of the original is determined (step S16), and the result of the determination is stored in the memory (step S17). The processing of steps S15–S17 is repeated until the last original is completely read (step S18).

Upon completion of the reading of the last original, it is determined if a Z-type layout has been selected (step S19).

If the result of the determination in step S19 is affirmative, it is then determined if the direction of the first-page original is lateral, by referring to the result of the determination stored in the above-described step S17 (step S20). If the result of the determination in step S20 is affirmative, the direction of each image to be laid out is rotated so as to be adjusted with the direction of the first-page original, and image formation is performed by laying out respective images in the form of an "N", the resultant image is printed (step S21), and the process is terminated.

If the result of the determination in step S20 is negative, i.e., if the direction of the first-page original is longitudinal, the direction of each image to be laid out is rotated so as to be adjusted with the direction of the first-page original, and image formation is performed by laying out respective images in the form of a "Z" and the resultant image is printed (step S22), and the process is terminated.

If the result of the determination in step S19 is negative, it is then determined if an inverse-Z-type layout has been selected (step S23). If the result of the determination in step S23 is affirmative, it is then determined if the direction of the first-page original is lateral by referring to the result of the determination stored in the above-described step S17 (step S24). If the result of the determination in step S24 is affirmative, the direction of each image to be laid out is rotated so as to be adjusted with the direction of the first-page original, and image formation is performed by laying out respective images in the form of an inverse "N", the resultant image is printed (step S25), and the process is terminated.

If the result of the determination in step S24 is negative, i.e., if the direction of the first-page original is longitudinal, the direction of each image to be laid out is rotated so as to be adjusted with the direction of the first-page original, and image formation is performed by laying out respective images in the form of an inverse "Z".

If the result of the determination in step S23 is negative, it is then determined if an N-type layout has been selected (step S27). If the result of the determination in step S27 is affirmative, it is then determined if the direction of the first-page original is lateral by referring to the result of the determination stored in the above-described step S17 (step S28). If the result of the determination in step S28 is affirmative, the direction of each image to be laid out is rotated so as to be adjusted with the direction of the first-page original, and image formation is performed by laying out respective images in the form of a "Z", the resultant image is printed (step S29), and the process is terminated.

If the result of the determination in step S28 is negative, i.e., if the direction of the first-page original is longitudinal, the direction of each image to be laid out is rotated so as to be adjusted with the direction of the first-page original, and image formation is performed by laying out respective images in the form of an "N" and the resultant image is printed (step S30), and the process is terminated.

If the result of the determination in step S27 is negative, it is then determined if the direction of the first-page original is lateral by referring to the result of the determination stored in the above-described step S17 (step S31). If the result of the determination in step S31 is affirmative, the direction of each image to be laid out is rotated so as to be adjusted with the direction of the first-page original, and image formation is performed by laying out respective images in the form of an inverse "Z", the resultant image is printed (step S32), and the process is terminated.

If the result of the determination in step S31 is negative, i.e., if the direction of the first-page original is longitudinal, the direction of each image to be laid out is rotated so as to be adjusted with the direction of the first-page original, and image formation is performed by laying out respective images in the form of an inverse "N", the resultant image is printed (step S33), and the process is terminated.

The copying magnification at each layout is automatically determined based on the selected sheet size and the size of the original in the determined direction. However, the copying magnification may be manually selected.

It is possible to realize the above-described control method by storing a program corresponding to the flowcharts shown in FIGS. 21–24 in a storage device (for example, the ROM 24) within the image forming apparatus and executing the program.

As described above, in the first embodiment, in the reduced-layout mode, the user can select a desired order of layout. Hence, it is possible to output images with a desired reduced layout without being aware of the order of arrangement of originals.

Operation of a Second Embodiment of the Present Invention

The configuration of an image forming apparatus according to a second embodiment of the present invention is the same as that of the first embodiment described with reference to FIGS. 1–20. The operation of the second embodiment will now be described with reference to the flowcharts shown in FIGS. 25–27.

Figure 25:
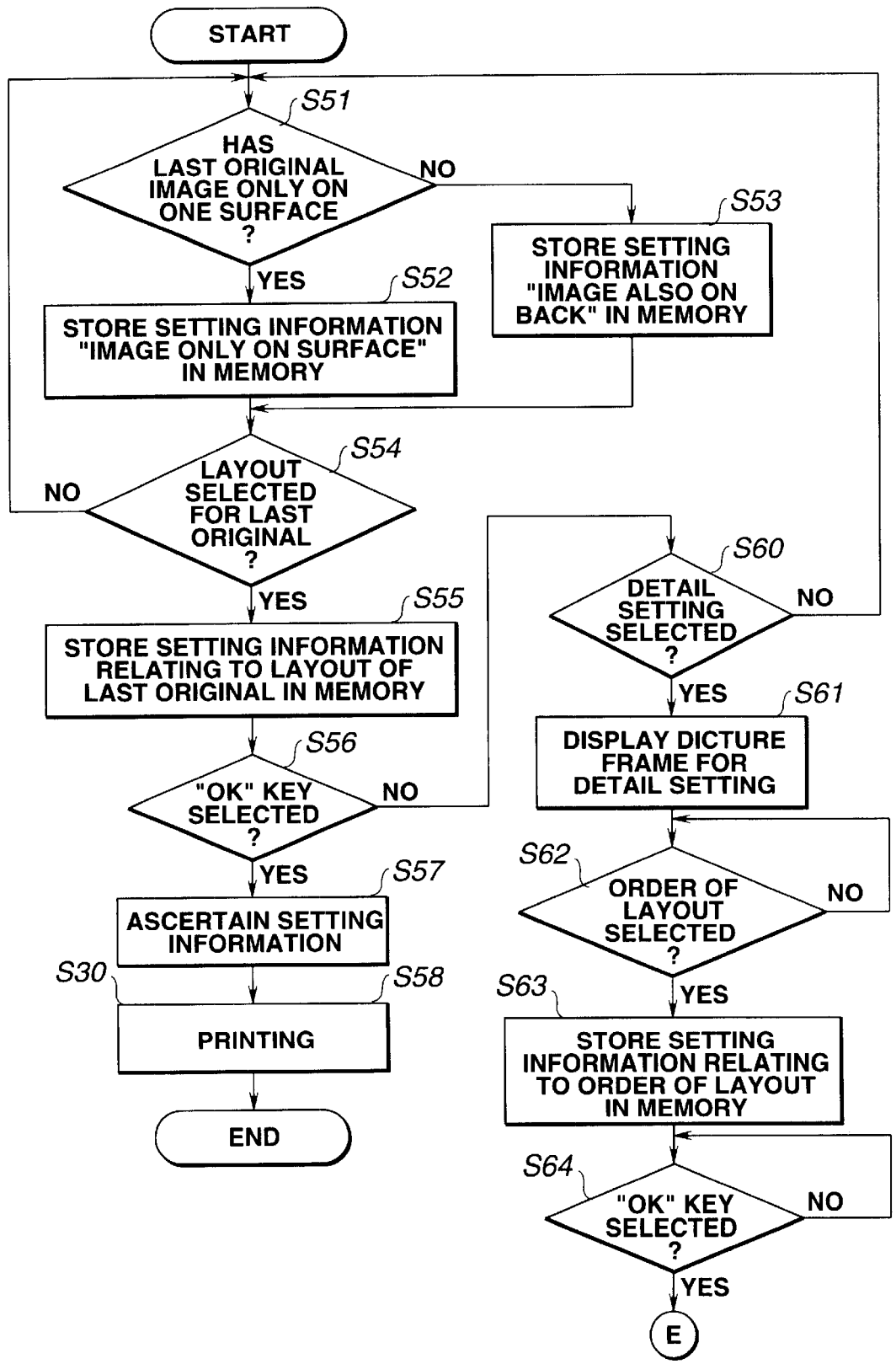
FIGS. 25–27 are flowcharts illustrating a control operation (a magnified-layout mode) in a second embodiment of the present invention.
Figure 26:
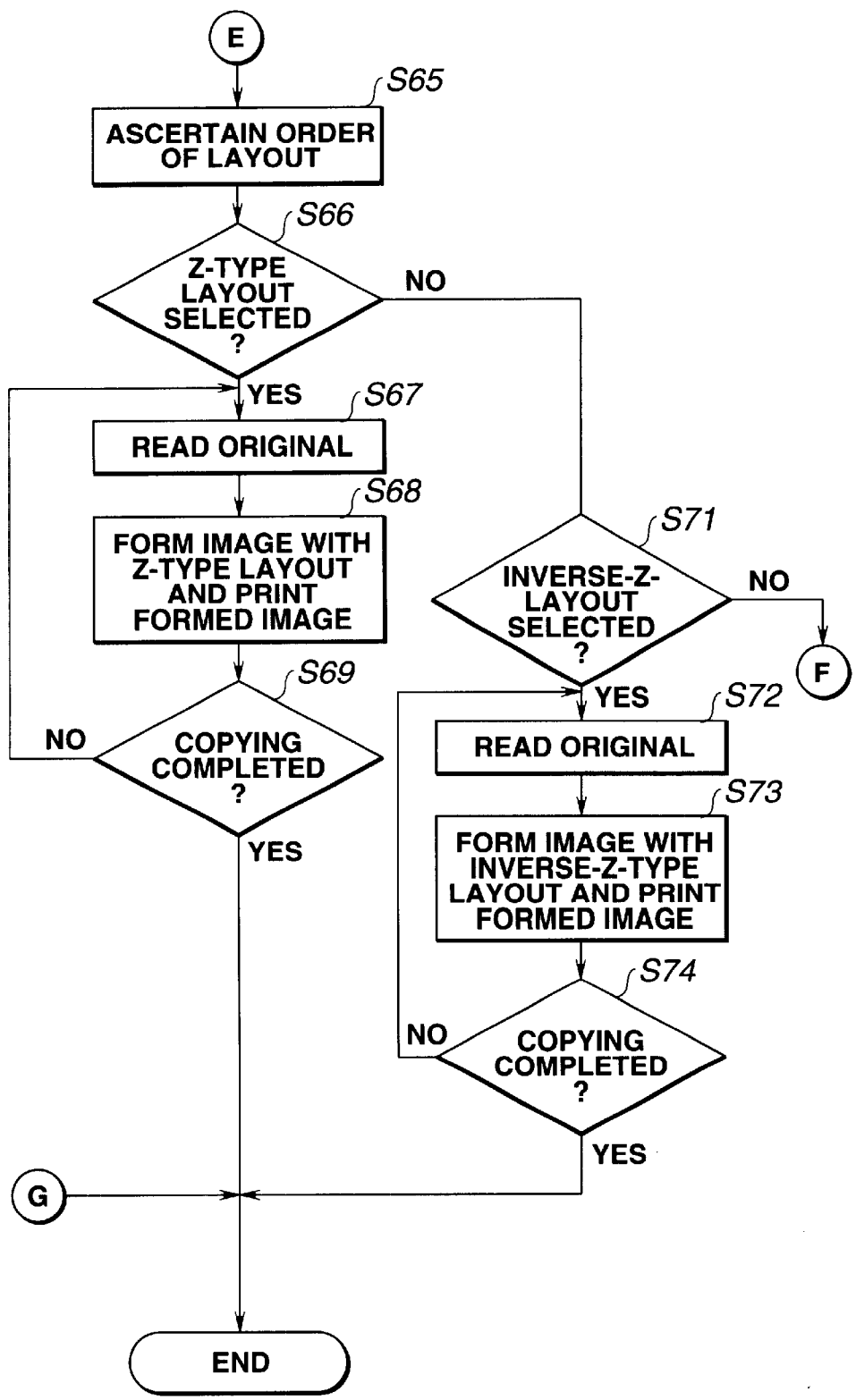

FIGS. 25 and 26 are flowcharts illustrating the operation when magnified duplex 1to4 has been selected on the magnified-layout-type selection picture frame shown in FIG. 16.

In the flowchart shown in FIG. 25, first, in order to determine if an image is present only on the surface of the last original or an image is also present on the back of the last original, it is determined if a surface key 611 has been selected on the last-original layout setting picture frame shown in FIG. 19 (step S51). If the result of the determination in step S51 is affirmative, setting information "an image is present only on the surface of the last original" is stored in the memory (step S52). If the result of the determination in step S51 is negative, setting information "an image is also present on the back of the last original" is stored in the memory (step S53).

Then, it is determined if one of the four types (i.e., the Z type, the inverse-Z type, the inverse-N type, and the N type) of layout of the last original has been selected (step S54). If the result of the determination in step S54 is affirmative, setting information relating to the selected layout is stored in the memory (step S55). If the result of the determination in step S54 is negative, the process returns to step S51.

After the above-described step S55, it is determined if an OK key 617 has been selected (step S56). If the result of the determination in step S56 is affirmative, the setting information selected in step S52, S53 or S55 is ascertained (step S57), and image formation is performed in a Z-type layout and the resultant image is printed (step S58), and the process is terminated.

If the result of the determination in step S56 is negative, it is then determined if a detail-setting key 618 has been selected (step S60). If the result of the determination in step S60 is affirmative, the picture frame for detail setting (see FIG. 20) is displayed (step S61).

Then, it is determined if one of the four types of the orders of layout has been selected (step S62). If the result of the determination in step S62 is affirmative, setting information relating to the selected order of layout is stored in the memory (step S63), and it is determined if the OK key 625 has been selected (step S64).

If the result of the determination in step S64 is affirmative, the process proceeds to step S65 shown in FIG. 26. In step S65, the setting information selected in step S52 (or step S53), step S55 or step S63 shown in FIG. 25 is ascertained.

Then, it is determined if the layout ascertained in step S65 indicates output of a Z-type layout (step S66). If the result of the determination in step S66 is affirmative, reading of the original is started (step S67). The read image of the original is divided into four images, image formation is performed in the order of the Z type, and the resultant image is printed (step S68). The processing of steps S67–S69 is repeated until the copying operation is completed (step S69).

If the result of the determination in step S66 is negative, it is then determined if output of an inverse-Z-type layout has been selected (step S71). If the result of the determination in step S71 is affirmative, reading of the original is started (step S72). The read image of the original is divided into four images, image formation is performed in the order of the inverse-Z type, and the resultant image is printed (step S73). The processing of steps S72–S74 is repeated until the copying operation is completed (step S74).

If the result of the determination in step S71 is negative, it is then determined if output of an N-type layout has been selected (step S75). If the result of the determination in step S75 is affirmative, reading of the original is started (step S76). The read image of the original is divided into four images, image formation is performed in the order of the N type, and the resultant image is printed (step S77). The processing of steps S76–S78 is repeated until the copying operation is completed (step S78).

If the result of the determination in step S75 is negative, reading of the original is started (step S79). The read image of the original is divided into four images, image formation is performed in the order of the inverse N type, and the resultant image is printed (step S80). The processing of steps S79–S81 is repeated until the copying operation is completed (step S81).

The copying magnification at each layout is automatically determined based on the detected original-size and the selected sheet size. However, the copying magnification may be manually selected.

As described above, in the second embodiment, the user can perform image output with a desired magnified layout in the desired order of image recording.

Figure 27:
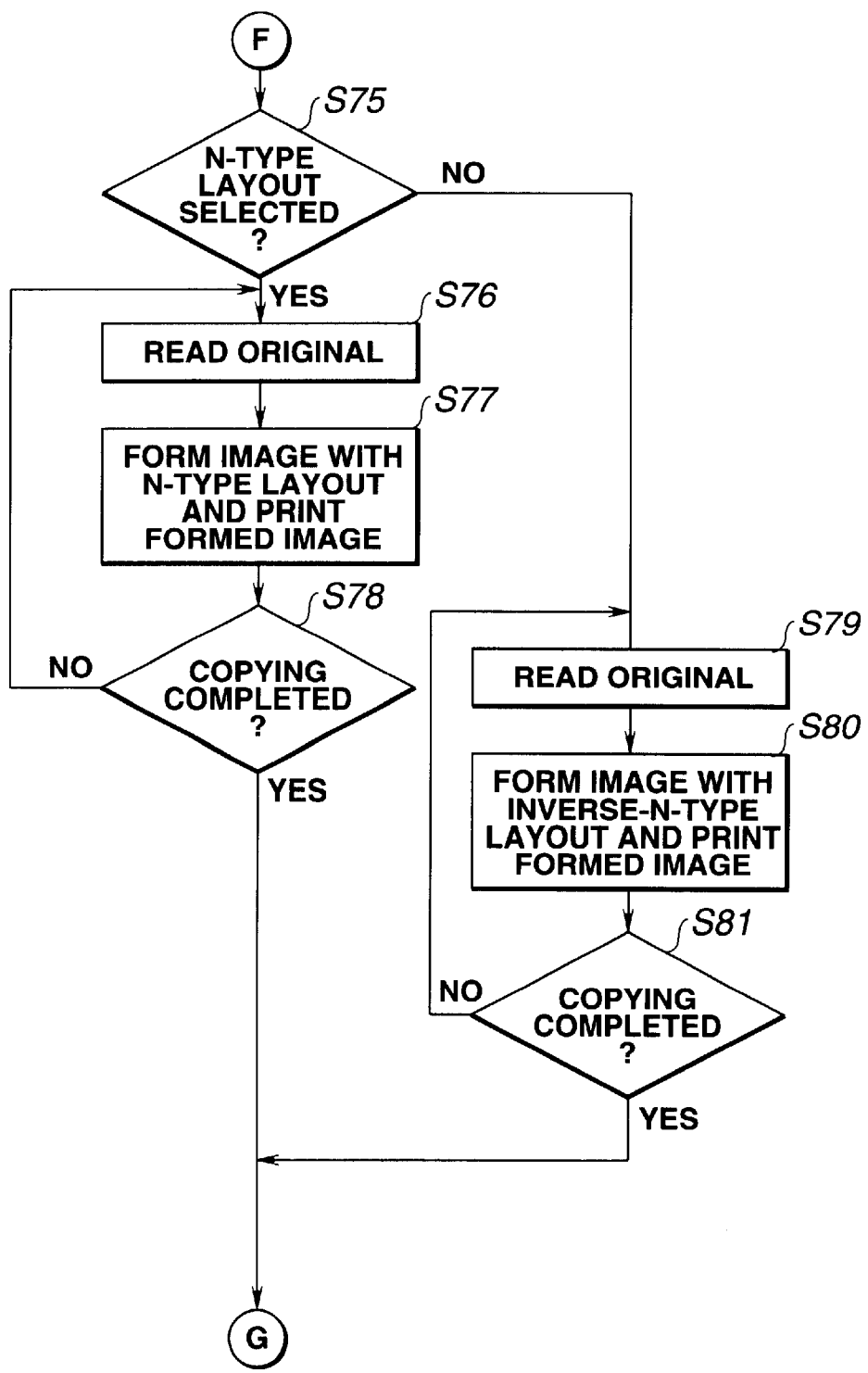

It is possible to realize the above-described control method by storing a program corresponding to the flowcharts shown in FIGS. 25–27 in a storage device (for example, the ROM 24) within the image forming apparatus and operating the program.

The present invention is not limited to the apparatus of the above-described embodiments, but may be applied to a system comprising a plurality of apparatuses or to an apparatus comprising a single unit. The objects of the present invention may, of course, also be achieved by supplying a system or an apparatus with a storage medium storing program codes of software for realizing the functions of the above-described embodiments, and reading and executing the program codes stored in the storage medium by means of a computer (or a CPU or an MPU (microprocessor unit)) of such system or the apparatus.

In such a case, the program codes themselves read from the storage medium realize the functions of the above-described embodiments, so that the storage medium storing the program codes constitutes an embodiment of the present invention. For example, a floppy disk, a hard disk, an optical disk, a magnetooptical disk, a CD(compact disc)-ROM, a CD-R (recordable), a magnetic tape, a nonvolatile memory card or a ROM may be used as the storage medium for supplying the program codes. The present invention may, of course, be applied not only to a case in which the functions of the above-described embodiments are realized by executing program codes read by a computer, but also to a case in which an OS (operating system) or the like operating in a computer executes a part or the entirety of actual processing, and the functions of the above-described embodiments are realized by such processing.

The present invention may, of course, be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiments are realized by the processing.

The individual components shown in outline or designated by blocks in the drawings are all well known in the image forming apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus comprising:
    a reading unit for reading an image of an original;
    mode setting means for setting a 1 to N mode for dividing an image of an original into a plurality of regions and recording an image in each of the regions on a different sheet;
    manual-selection means for manually selecting an order of output of plurality of regions in the 1 to N mode;
    second selection means for selecting a number of the divided regions of the original;
    third selection means for selecting a number of the divided regions of a predetermined page of a series of pages of the original so as to distinguish the number of divided images between the series of pages of the original composed of a plurality of pages other than the predetermined page and the predetermined page; and
    output control means for outputting the divided images of the number selected by said second selection means in the order of output selected by said manual-selection means when the pages other than the predetermined page of said series of pages of the original are processed, and for inhibiting output of the divided images of the number selected by said second selection means and outputting the divided images of the number selected by said third selection means in the order of output selected by said manual-selection means when said predetermined page of said series of pages of the original is processed.

2. An image forming apparatus according to claim 1, further comprising reading control means for controlling reading of images in the plurality of regions based on an order of output selected by said manual-selection means.

3. An image forming apparatus according to claim 1, wherein said manual-selection means causes said apparatus to display a different selection picture frame in accordance with a result of the selection of said second selection means.

4. An image forming apparatus according to claim 1, wherein said predetermined page is the last page of said series of pages of the original.

5. A method of controlling an image forming apparatus to execute a 1 to N mode for dividing an image of an original into a plurality of regions and recording the plurality of divided images on different sheets respectively, comprising:
    a setting step of setting an order of forming the plurality of divided images to be formed on different sheets respectively;
    a first selecting step of selecting a number of the divided images of the original;
    a second selecting step of selecting a number of the divided images of a predetermined page of a series of pages of the original so as to distinguish the number of divided images between pages of a series of pages of the original composed of a plurality of pages other than the predetermined page and the predetermined page; and
    a control step of image-forming the divided images of the number selected in said first selecting step in the order set in said setting step when the pages of said series of pages of the original other than the predetermined page are processed, and inhibiting image-forming of the divided images of the number selected in said first selection step and image-forming the divided images of the number selected in said second selection step in the order set in said setting step when said predetermined page of said series of pages of the original is processed.

6. A method according to claim 5, wherein said predetermined page is the last page of said series of the pages of the original.

7. A recording medium, readable by a computer, storing a program for causing an image forming apparatus to execute a 1 to N mode for dividing an image of an original into a plurality of regions and recording the plurality of divided images on different sheets respectively to execute method steps comprising:
    a setting step of setting an order of forming the plurality of divided images to be formed on different sheets respectively;
    a first selecting step of selecting a number of the divided images of the original;
    a second selecting step of selecting a number of the divided images of a predetermined page of a series of pages of the original so as to distinguish the number of divided images between pages of a series of pages of the original composed of a plurality of pages other than the predetermined page and the predetermined page; and
    a control step of image-forming the divided images of the number selected in said first selecting step in the order set in said setting step when the pages of said series of pages of the original other than the predetermined page are processed, and inhibiting image-forming of the divided images of the number selected in said first selection step and image-forming the divided images of the number selected in said second selection step in the order set in said setting step when said predetermined page of said series of pages of the original is processed.

* * * * *